(12) United States Patent
Stam et al.

(10) Patent No.: US 6,850,691 B1
(45) Date of Patent: Feb. 1, 2005

(54) AUTOMATIC PLAYBACK OVERSHOOT CORRECTION SYSTEM

(75) Inventors: Wijnand Van Stam, Sunnyvale, CA (US); Robert Vallone, Palo Alto, CA (US)

(73) Assignee: Tivo, Inc., Alviso, CA (US)

( * ) Notice: Subject to any disclaimer, the term of this patent is extended or adjusted under 35 U.S.C. 154(b) by 0 days.

(21) Appl. No.: 09/539,295

(22) Filed: Mar. 30, 2000

Related U.S. Application Data

(60) Provisional application No. 60/127,178, filed on Mar. 30, 1999.

(51) Int. Cl.$^7$ ................................................ H04N 5/91
(52) U.S. Cl. ............................................ 386/68; 386/70
(58) Field of Search ............................ 386/46, 68, 70, 386/80, 81, 82, 95; 369/44.11

(56) References Cited

U.S. PATENT DOCUMENTS

| | | | |
|---|---|---|---|
| 4,600,989 A | | 7/1986 | Schwartz et al. ............ 364/200 |
| 4,805,050 A | * | 2/1989 | Aoyagi et al. ............. 369/44.11 |
| 5,063,547 A | | 11/1991 | Custers et al. ................ 369/32 |
| 5,502,504 A | | 3/1996 | Marshall et al. ............. 348/565 |
| 5,701,383 A | | 12/1997 | Russo et al. ................... 386/46 |
| 5,710,601 A | | 1/1998 | Marshall et al. ............. 348/564 |
| 5,878,186 A | | 3/1999 | Bennett et al. ................ 386/85 |
| 6,055,355 A | * | 4/2000 | Lee ............................... 386/70 |

FOREIGN PATENT DOCUMENTS

| | | | |
|---|---|---|---|
| EP | 0 435 370 A2 | 7/1991 | ............ H03J/9/06 |
| EP | 0 691 651 A1 | 1/1996 | ........... G11B/27/34 |
| EP | 0 764 951 A1 | 3/1997 | ......... G11B/27/034 |
| EP | 0 889 649 A2 | 1/1999 | .......... H04N/5/775 |
| EP | 0 898 279 A2 | 2/1999 | ........... G11B/27/10 |
| EP | 0 889 649 A3 | 8/1999 | .......... H04N/5/775 |
| WO | 93/08664 | 4/1993 | ............ H04N/5/78 |
| WO | 94/14282 | 6/1994 | ............ H04N/7/16 |
| WO | 96/38008 | 11/1996 | ............ H04N/7/52 |
| WO | 98/12872 | 3/1998 | ............ H04N/5/44 |

* cited by examiner

Primary Examiner—Huy Nguyen
(74) Attorney, Agent, or Firm—Kirk D. Wong; Hickman Palermo Truong & Becker LLP

(57) ABSTRACT

An automatic playback overshoot correction system predicts the position in the program material where the user expects to be when the user stops the fast forward or reverse progression of the program material. The invention determines the position where the program material was stopped. The media controller transitions to the new mode that the user selected, starting at the stopped position with an overshoot correction factor added or subtracted from it. The invention adapts to the user by remembering how much the user corrects after he stops the fast forward or reverse mode. Correction factors are calculated using the user's corrections and adjusting the correction factors if the user continues to make corrections. The invention also uses a prediction method to correctly place the user within the program upon transition out of either mode and determines if the speed of the fast forward or reverse modes and then automatically subtracts or adds, respectively, a time multiple to the frame where the transition was detected and positions the user at the correct frame. The time multiple is fine tuned if the user is consistently correcting after the fast forward or rewind mode stops. Another method initially tests the user's reaction time using a test video and asks the user to press the fast forward or reverse button on his control device during the test video and then asks the user to position the video to the place that he expected the system to have been. This time span is then used whenever the user uses the fast forward or reverse modes and is adjusted with a multiple for each speed. A final method allows the user to simply set a sensitivity setting that the system will use as a correction factor and a multiple is subtracted or added to the release frame whenever the user uses the fast forward or reverse modes, respectively.

18 Claims, 34 Drawing Sheets

AUTOMATIC PLAYBACK OVERSHOOT CORRECTION SYSTEM

CROSS REFERENCE TO RELATED APPLICATIONS

This application claims benefit of U.S. Provisional Application No. 60/127,178 filed Mar. 30, 1999.

BACKGROUND OF THE INVENTION

1. Technical Field

The invention relates to the operation of audio and video equipment in a computer environment. More particularly, the invention relates to automatically compensating for a user's reaction time when stopping the forward or reverse progression through audio or video program media in a computer environment.

2. Description of the Prior Art

Multimedia devices such as VCRs, DVD players, MP3 players, cassette players, CD players, video tape editors, and the new class of Personal Video Recorders (PVR) are extremely popular with consumers. Almost every household in the United States has at least one of these devices.

Multimedia devices must have some way of jumping through the program material to allow the user to select his desired position in the program material. This has commonly been achieved using a fast forward and reverse mode. The fast forward mode moves through the program material in a forward progression and the reverse mode moves backwards in program material.

The user simply presses a button (normally on a remote control) to initiate a fast forward or reverse mode and then presses a button to terminate the fast forward or reverse mode. The time that it takes the user to recognize the audio or video passage that he desires, to press the button to terminate the fast forward or reverse progression, and the multimedia device to react to the user's command and stop the progression varies among multimedia devices.

Several factors are involved in this time lag. The first is the user's reaction time. The average human being has a fairly slow reaction time to visual events. That is, the time that it takes for a human being to recognize a visual event and to physically react is relatively slow. Military tests have shown that this reaction time is, for pilots, on the average of one tenth of a second.

The second factor is the time that it takes for the user's command to be sent from the device that he is using to the multimedia device (typically a negligible value) and the device's ability to react to the command and stop the media. This factor varies with the multimedia device and the media itself.

The third factor is the speed of the fast forward or reverse mode. The faster speed results in the further progression through the program material and therefore a larger error factor.

The position where the program material stopped is normally not where the user had expected it to be. The user typically must correct for the error by fast forwarding or reversing the program material once again to get to the expected position.

It would be advantageous to provide an automatic playback overshoot correction system that corrects for the difference between the user's expected stop position h the program media and the actual position where the media was stopped. It would further be advantageous to provide a system that is transparent to the user during operation.

SUMMARY OF THE INVENTION

The invention provides an automatic playback overshoot correction system. The system automatically corrects for the difference between the user's expected stop position in the program material and the actual position where the media was stopped whenever the user terminates fast forwarding or reversing the program material. In addition, the invention provides a system that is operationally transparent to the user.

A preferred embodiment of the invention predicts the position in the program material where the user expects to be when the user stops the fast forward or reverse progression of the program material. The invention determines the position where the program material was stopped. The media controller transitions to the new mode that the user selected, starting at the stopped position with an overshoot correction factor added or subtracted from it.

The invention adapts to the user by remembering how much the user corrects (i.e., reverses or fast forwards) after he stops the fast forward or reverse mode (in each speed if multiple speed fast forward or reverse modes are available). Correction factors are calculated using the user's corrections. The invention adjusts the correction factors if it observes that the user continues to make corrections.

The invention also uses a prediction method to correctly place the user within the program upon transition out of either mode. The prediction method determines the speed of the fast forward or reverse modes and then automatically subtracts or adds, respectively, a time multiple (depending upon the actual speed) to the frame where the transition was detected and positions the user at the correct frame. The system fine tunes the time multiple if it sees that the user is consistently correcting after the fast forward or rewind mode stops.

Another method initially tests the user's reaction time using a test video. It asks the user to press the fast forward or reverse button on his control device during the test video and then asks the user to position the video to the place that he expected the system to have been. This time span is then used whenever the user uses the fast forward or reverse modes and is adjusted with a multiple for each speed.

A final method allows the user to simply set a sensitivity setting that the system will use as a correction factor. The invention will subtract or add a multiple of the factor to the release frame whenever the user uses the fast forward or reverse modes, respectively.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in an automatic playback overshoot correction system in a computer environment. A system according to the invention automatically corrects for the difference between the user's expected stop position in the program material and the actual position where the media was stopped whenever the user terminates fast forwarding or reversing the program material. In addition, the invention provides a system that is operationally transparent to the user.

A preferred embodiment of the invention predicts the position in the program material where the user expects to be when the user stops the fast forward or reverse progression of the program material.

Figure 1:
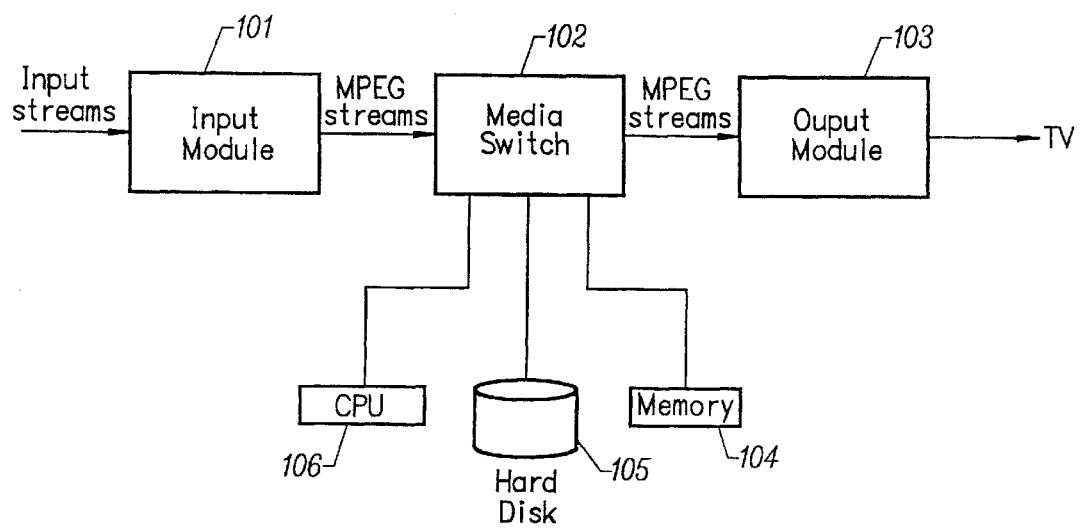
FIG. 1 is a block schematic diagram of a high level view of a preferred embodiment of the invention according to the invention.

Referring to FIG. 1, a preferred embodiment of the invention has an Input Section 101, Media Switch 102, and an Output Section 103. The Input Section 101 takes television (TV) input streams in a multitude of forms, for example, National Television Standards Committee (NTSC) or PAL broadcast, and digital forms such as Digital Satellite System (DSS), Digital Broadcast Services (DBS), or Advanced Television Standards Committee (ATSC). DBS, DSS and ATSC are based on standards called Moving Pictures Experts Group 2 (MPEG2) and MPEG2 Transport. MPEG2 Transport is a standard for formatting the digital data stream from the TV source transmitter so that a TV receiver can disassemble the input stream to find programs in the multiplexed signal. The Input Section 101 produces MPEG streams. An MPEG2 transport multiplex supports multiple programs in the same broadcast channel, with multiple video and audio feeds and private data. The Input Section 101 tunes the channel to a particular program, extracts a specific MPEG program out of it, and feeds it to the rest of the system. Analog TV signals are encoded into a similar MPEG format using separate video and audio encoders, such that the remainder of the system is unaware of how the signal was obtained. Information may be modulated into the Vertical Blanking Interval (VBI) of the analog TV signal in a number of standard ways; for example, the North American Broadcast Teletext Standard (NABTS) may be used to modulate information onto lines 10 through 20 of an NTSC signal, while the FCC mandates the use of line 21 for Closed Caption (CC) and Extended Data Services (EDS). Such signals are decoded by the input section and passed to the other sections as if they were delivered via an MPEG2 private data channel.

The Media Switch 102 mediates between a microprocessor CPU 106, hard disk or storage device 105, and memory 104. Input streams are converted to an MPEG stream and sent to the Media Switch 102. The Media Switch 102 buffers the MPEG stream into memory. It then performs two operations if the user is watching real time TV: the stream is sent to the Output Section 103 and it is written simultaneously to the hard disk or storage device 105.

The Output Section 103 takes MPEG streams as input and produces an analog TV signal according to the NTSC, PAL, or other required TV standards. The Output Section 103 contains an MPEG decoder, On-Screen Display (OSD) generator, analog TV encoder and audio logic. The OSD generator allows the program logic to supply images which will be overlaid on top of the resulting analog TV signal. Additionally, the Output Section can modulate information supplied by the program logic onto the VBI of the output signal in a number of standard formats, including NABTS, CC and EDS.

Figure 2:
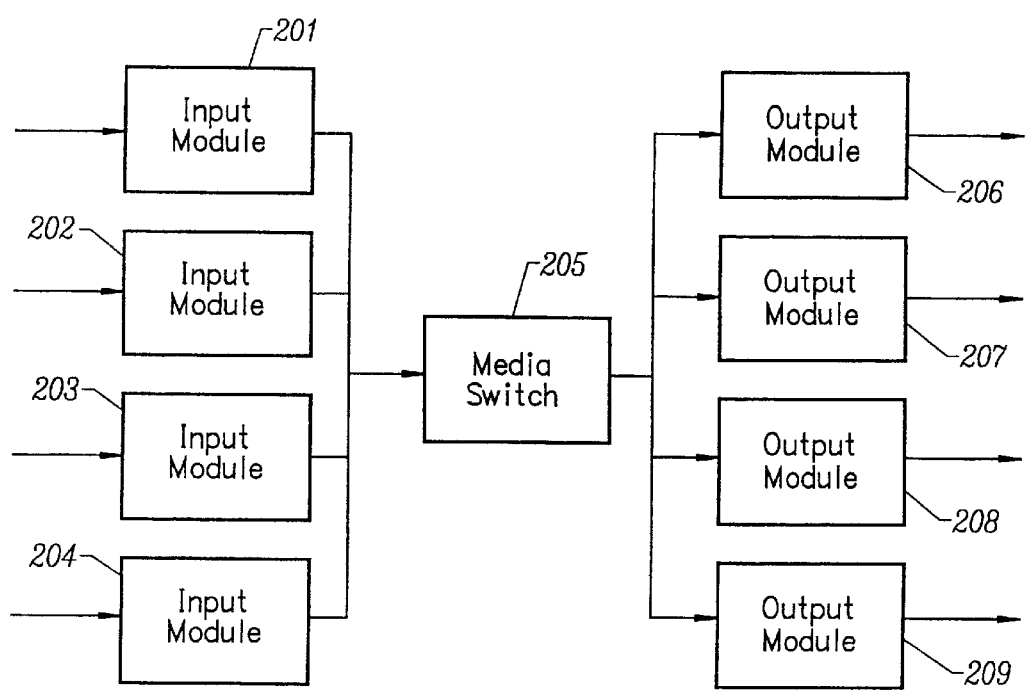
FIG. 2 is a block schematic diagram of a preferred embodiment of the invention using multiple input and output modules according to the invention.

With respect to FIG. 2, the invention easily expands to accommodate multiple Input Sections (tuners) 201, 202, 203, 204, each can be tuned to different types of input. Multiple Output Modules (decoders) 206, 207, 208, 209 are added as well. Special effects such as picture in a picture can be implemented with multiple decoders. The Media Switch 205 records one program while the user is watching another. This means that a stream can be extracted off the disk while another stream is being stored onto the disk.

Figure 3:
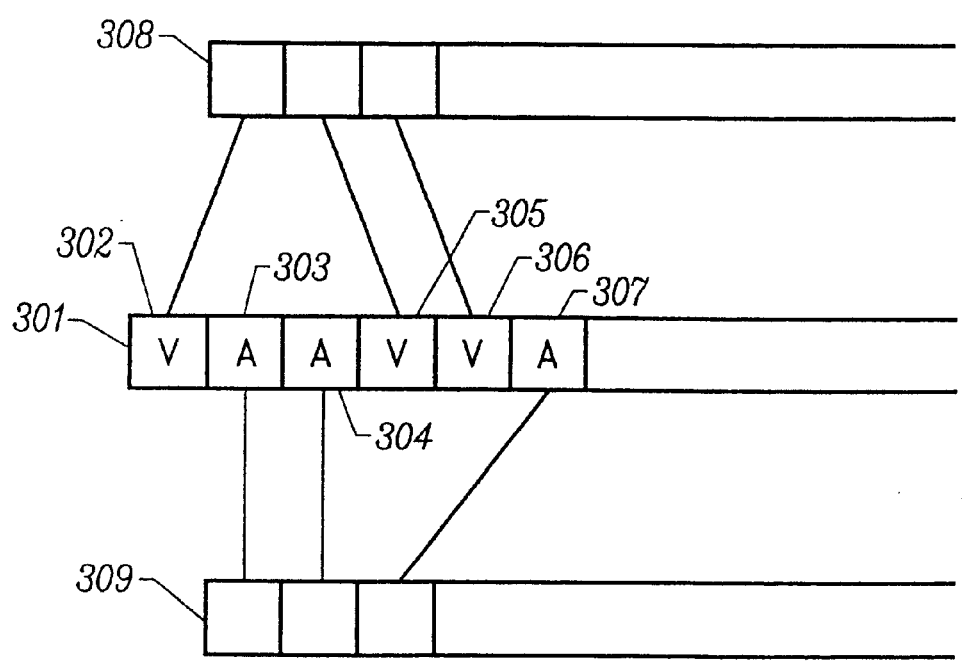
FIG. 3 is a schematic diagram of an Moving Pictures Experts Group (MPEG) data stream and its video and audio components according to the invention.

Referring to FIG. 3, the incoming MPEG stream 301 has interleaved video 302, 305, 306 and audio 303, 304, 307 segments. These elements must be separated and recombined to create separate video 308 and audio 309 streams or buffers. This is necessary because separate decoders are used to convert MPEG elements back into audio or video analog components. Such separate delivery requires that time sequence information be generated so that the decoders may be properly synchronized for accurate playback of the signal.

The Media Switch enables the program logic to associate proper time sequence information with each segment, possibly embedding it directly into the stream. The time sequence information for each segment is called a time stamp. These time stamps are monotonically increasing and start at zero each time the system boots up. This allows the invention to find any particular spot in any particular video segment. For example, if the system needs to read five seconds into an incoming contiguous video stream that is being cached, the system simply has to start reading forward into the stream and look for the appropriate time stamp.

A binary search can be performed on a stored file to index into a stream. Each stream is stored as a sequence of fixed-size segments enabling fast binary searches because of the uniform timestamping. If the user wants to start in the middle of the program, the system performs a binary search of the stored segments until it finds the appropriate spot, obtaining the desired results with a minimal amount of information. If the signal were instead stored as an MPEG stream, it would be necessary to linearly parse the stream from the beginning to find the desired location.

Figure 4:
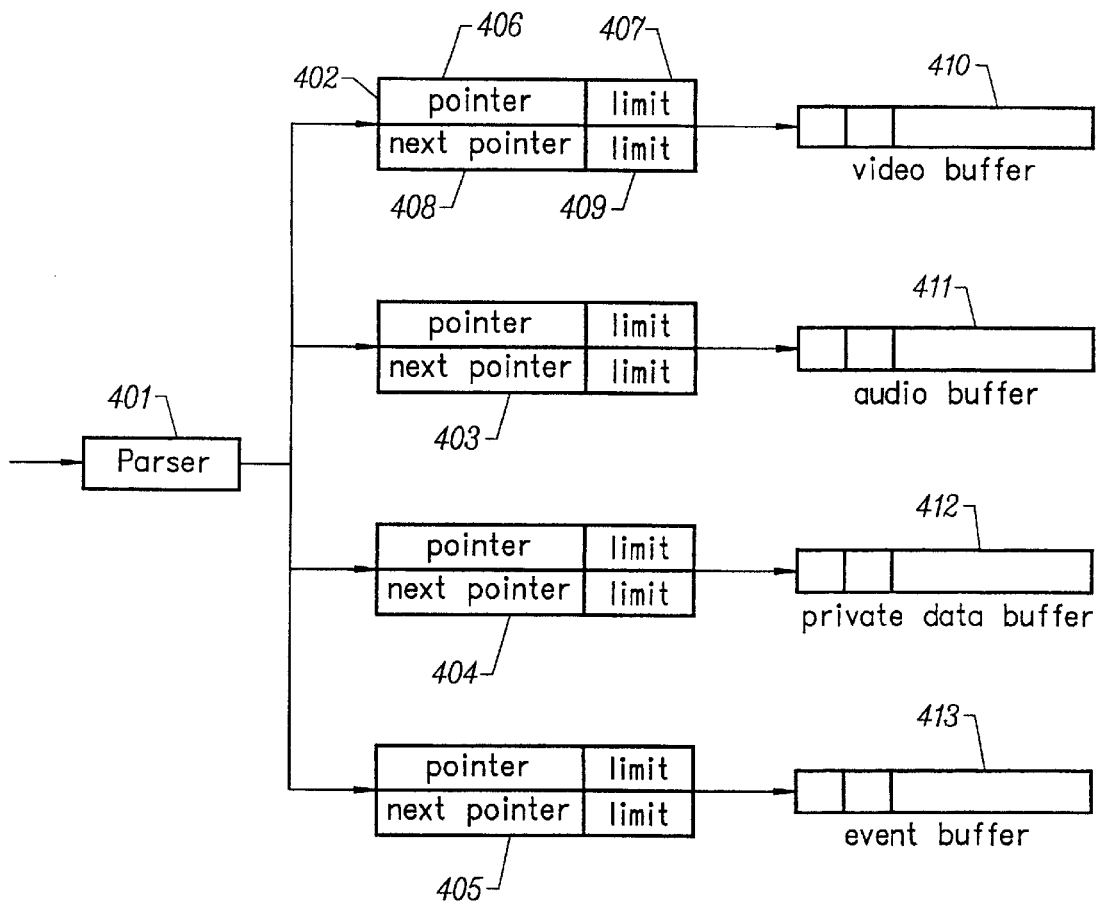
FIG. 4 is a block schematic diagram of a parser and four direct memory access (DMA) input engines contained in the Media Switch according to the invention.

With respect to FIG. 4, the Media Switch contains four input Direct Memory Access (DMA) engines 402, 403, 404, 405 each DMA engine has an associated buffer 410, 411, 412, 413. Conceptually, each DMA engine has a pointer 406, a limit for that pointer 407, a next pointer 408, and a limit for the next pointer 409. Each DMA engine is dedicated to a particular type of information, for example, video 402, audio 403, and parsed events 405. The buffers 410, 411, 412, 413 are circular and collect the specific information. The DMA engine increments the pointer 406 into the associated buffer until it reaches the limit 407 and then loads the next pointer 408 and limit 409. Setting the pointer 406 and next pointer 408 to the same value, along with the corresponding limit value creates a circular buffer. The next pointer 408 can be set to a different address to provide vector DMA.

The input stream flows through a parser 401. The parser 401 parses the stream looking for MPEG distinguished events indicating the start of video, audio or private data segments. For example, when the parser 401 finds a video event, it directs the stream to the video DMA engine 402. The parser 401 buffers up data and DMAs it into the video buffer 410 through the video DMA engine 402. At the same time, the parser 401 directs an event to the event DMA engine 405 which generates an event into the event buffer 413. When the parser 401 sees an audio event, it redirects the byte stream to the audio DMA engine 403 and generates an event into the event buffer 413. Similarly, when the parser 401 sees a private data event, it directs the byte stream to the private data DMA engine 404 and directs an event to the event buffer 413. The Media Switch notifies the program logic via an interrupt mechanism when events are placed in the event buffer.

Figure 5:
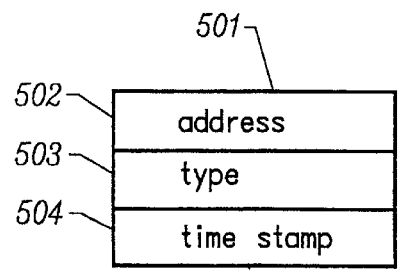
FIG. 5 is a schematic diagram of the components of a packetized elementary stream (PES) buffer according to the invention.

Referring to FIGS. 4 and 5, the event buffer 413 is filled by the parser 401 with events. Each event 501 in the event buffer has an offset 502, event type 503, and time stamp field 504. The parser 401 provides the type and offset of each event as it is placed into the buffer. For example, when an audio event occurs, the event type field is set to an audio event and the offset indicates the location in the audio buffer 411. The program logic knows where the audio buffer 411 starts and adds the offset to find the event in the stream. The address offset 502 tells the program logic where the next event occurred, but not where it ended. The previous event is cached so the end of the current event can be found as well as the length of the segment.

Figure 6:
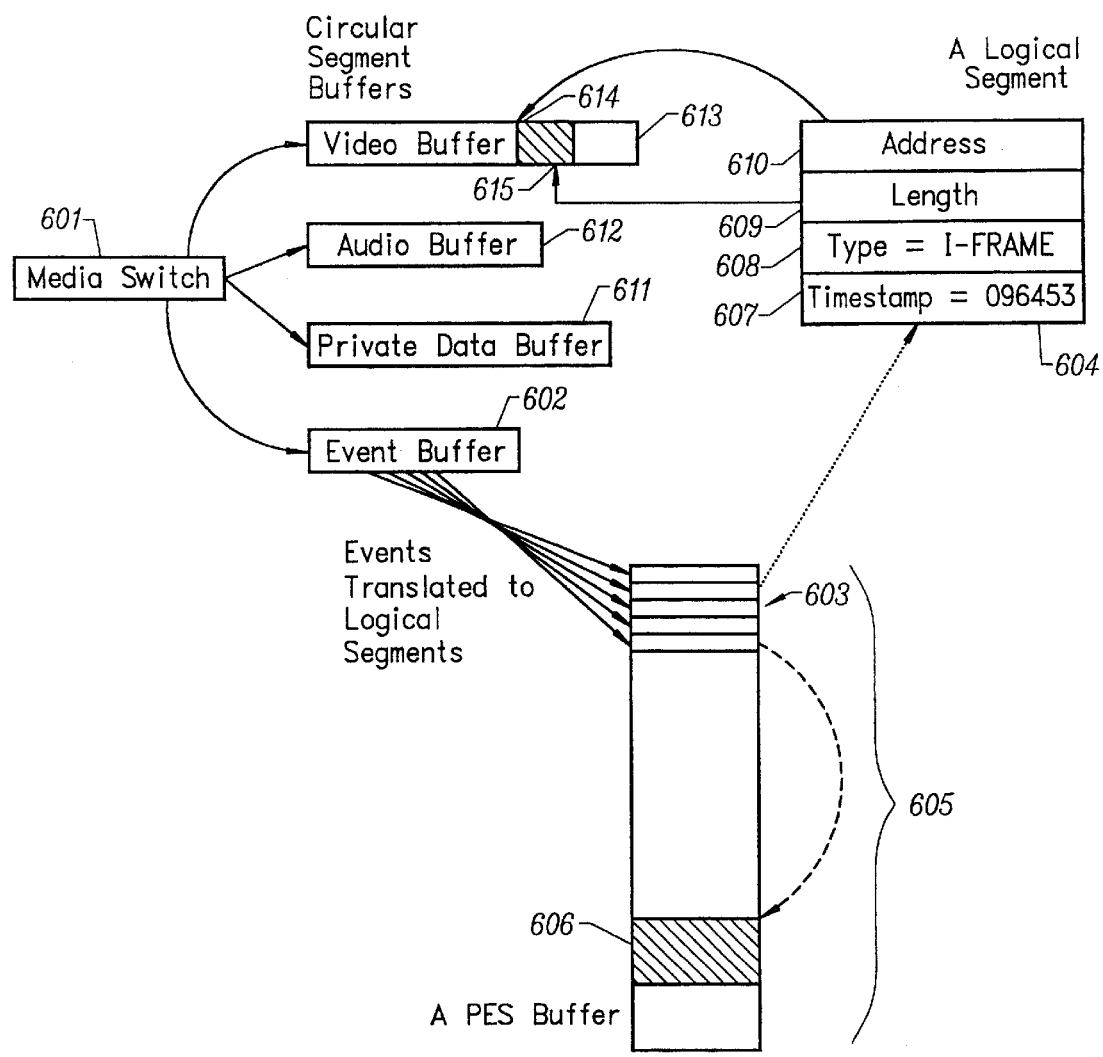
FIG. 6 is a schematic diagram of the construction of a PES buffer from the parsed components in the Media Switch output circular buffers.

With respect to FIGS. 5 and 6, the program logic reads accumulated events in the event buffer 602 when it is interrupted by the Media Switch 601. From these events the program logic generates a sequence of logical segments 603 which correspond to the parsed MPEG segments 615. The program logic converts the offset 502 into the actual address 610 of each segment, and records the event length 609 using the last cached event. If the stream was produced by encoding an analog signal, it will not contain Program Time Stamp (PTS) values, which are used by the decoders to properly present the resulting output. Thus, the program logic uses the generated time stamp 504 to calculate a simulated PTS for each segment and places that into the logical segment timestamp 607. In the case of a digital TV stream, PTS values are already encoded in the stream. The program logic extracts this information and places it in the logical segment timestamp 607.

The program logic continues collecting logical segments 603 until it reaches the fixed buffer size. When this occurs, the program logic generates a new buffer, called a Packetized Elementary Stream (PES) 605 buffer containing these logical segments 603 in order, plus ancillary control information. Each logical segment points 604 directly to the circular buffer, e.g., the video buffer 613, filled by the Media Switch 601. This new buffer is then passed to other logic components, which may further process the stream in the buffer in some way, such as presenting it for decoding or writing it to the storage media. Thus, the MPEG data is not copied from one location in memory to another by the processor. This results in a more cost effective design since lower memory bandwidth and processor bandwidth is required.

A unique feature of the MPEG stream transformation into PES buffers is that the data associated with logical segments need not be present in the buffer itself, as presented above. When a PES buffer is written to storage, these logical segments are written to the storage medium in the logical order in which they appear. This has the effect of gathering components of the stream, whether they be in the video, audio or private data circular buffers, into a single linear buffer of stream data on the storage medium. The buffer is read back from the storage medium with a single transfer from the storage media, and the logical segment information is updated to correspond with the actual locations in the buffer 606. Higher level program logic is unaware of this transformation, since it handles only the logical segments, thus stream data is easily managed without requiring that the data ever be copied between locations in DRAM by the CPU.

A unique aspect of the Media Switch is the ability to handle high data rates effectively and inexpensively. It performs the functions of taking video and audio data in, sending video and audio data out, sending video and audio data to disk, and extracting video and audio data from the disk on a low cost platform. Generally, the Media Switch runs asynchronously and autonomously with the microprocessor CPU, using its DMA capabilities to move large quantities of information with minimal intervention by the CPU.

Figure 7:
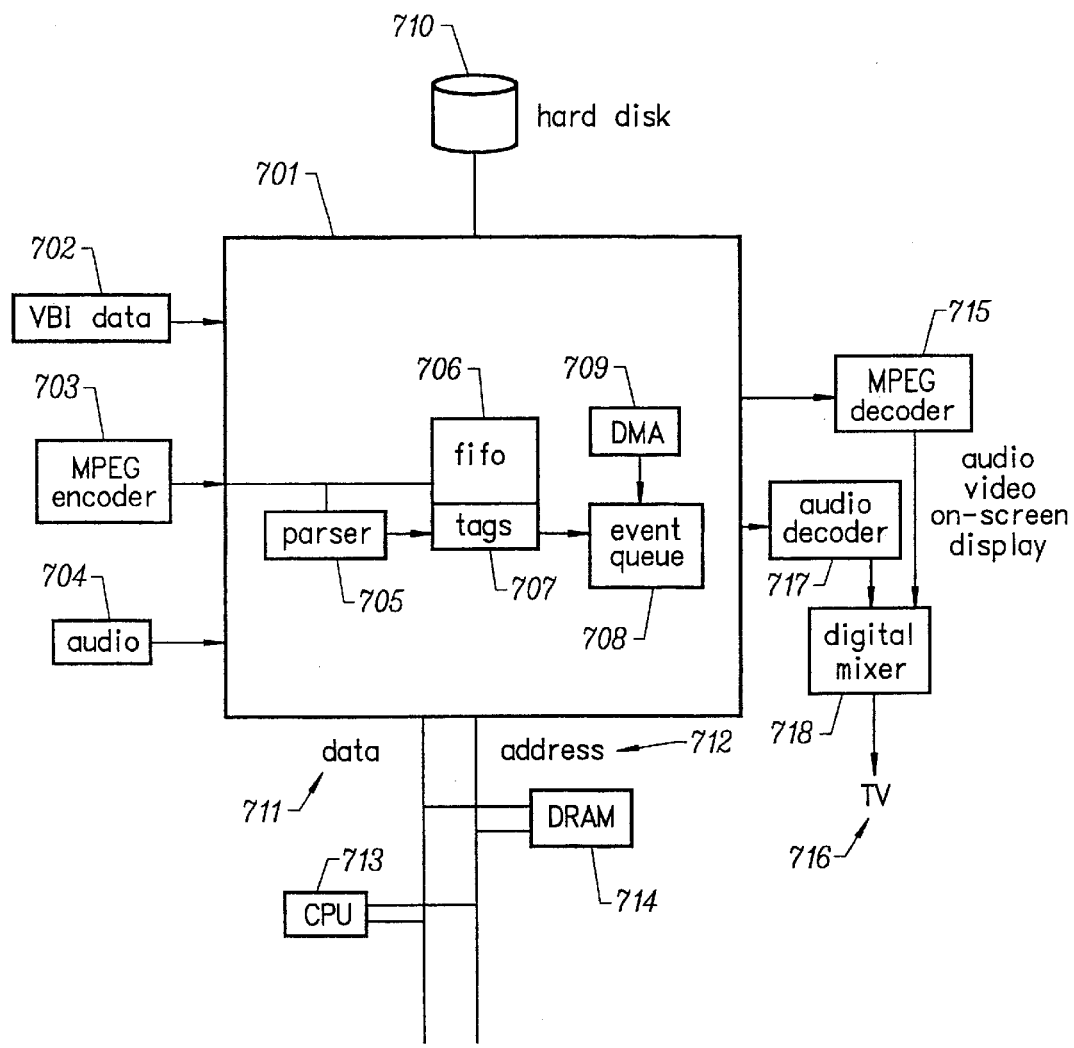
FIG. 7 is a block schematic diagram of the Media Switch and the various components that it communicates with according to the invention.

Referring to FIG. 7, the input side of the Media Switch 701 is connected to an MPEG encoder 703. There are also circuits specific to MPEG audio 704 and vertical blanking interval (VBI) data 702 feeding into the Media Switch 701. If a digital TV signal is being processed instead, the MPEG encoder 703 is replaced with an MPEG2 Transport Demultiplexor, and the MPEG audio encoder 704 and VBI decoder 702 are deleted. The demultiplexor multiplexes the extracted audio, video and private data channel streams through the video input Media Switch port.

The parser 705 parses the input data stream from the MPEG encoder 703, audio encoder 704 and VBI decoder 702, or from the transport demultiplexor in the case of a digital TV stream. The parser 705 detects the beginning of all of the important events in a video or audio stream, the start of all of the frames, the start of sequence headers—all of the pieces of information that the program logic needs to know about in order to both properly play back and perform special effects on the stream, e.g. fast forward, reverse, play, pause, fast/slow play, indexing, and fast/slow reverse play. The parser 705 places tags 707 into the FIFO 706 when it identifies video or audio segments, or is given private data. The DMA 709 controls when these tags are taken out. The tags 707 and the DMA addresses of the segments are placed into the event queue 708. The frame type information, whether it is a start of a video I-frame, video B-frame, video P-frame, video PES, audio PES, a sequence header, an audio frame, or private data packet, is placed into the event queue 708 along with the offset in the related circular buffer where the piece of information was placed. The program logic operating in the CPU 713 examines events in the circular buffer after it is transferred to the DRAM 714.

The Media Switch 701 has a data bus 711 that connects to the CPU 713 and DRAM 714. An address bus 712 is also shared between the Media Switch 701, CPU 713, and DRAM 714. A hard disk or storage device 710 is connected to one of the ports of the Media Switch 701. The Media Switch 701 outputs streams to an MPEG video decoder 715 and a separate audio decoder 717. The audio decoder 717 signals contain audio cues generated by the system in response to the user's commands on a remote control or other internal events. The decoded audio output from the MPEG decoder is digitally mixed 718 with the separate audio signal. The resulting signals contain video, audio, and on screen displays and are sent to the TV 716.

The Media Switch 701 takes in 8-bit data and sends it to the disk, while at the same time extracts another stream of data off of the disk and sends it to the MPEG decoder 715. All of the DMA engines described above can be working at the same time. The Media Switch 701 can be implemented in hardware using a Field Programmable Gate Array (FPGA), ASIC, or discrete logic.

Rather than having to parse through an immense data stream looking for the start of where each frame would be, the program logic only has to look at the circular event buffer in DRAM 714 and it can tell where the start of each frame is and the frame type. This approach saves a large amount of CPU power, keeping the real time requirements of the CPU 713 small. The CPU 713 does not have to be very fast at any point in time. The Media Switch 701 gives the CPU 713 as much time as possible to complete tasks. The parsing mechanism 705 and event queue 708 decouple the CPU 713 from parsing the audio, video, and buffers and the real time nature of the streams, which allows for lower costs. It also allows the use of a bus structure in a CPU environment that operates at a much lower dock rate with much cheaper memory than would be required otherwise.

The CPU 713 has the ability to queue up one DMA transfer and can set up the next DMA transfer at its leisure. This gives the CPU 713 large time intervals within which it can service the DMA controller 709. The CPU 713 may respond to a DMA interrupt within a larger time window because of the large latency allowed. MPEG streams, whether extracted from an MPEG2 Transport or encoded from an analog TV signal, are typically encoded using a technique called Variable Bit Rate encoding (VBR). This technique varies the amount of data required to represent a sequence of images by the amount of movement between those images. This technique can greatly reduce the required bandwidth for a signal, however sequences with rapid movement (such as a basketball game) may be encoded with much greater bandwidth requirements. For example, the Hughes DirecTV satellite system encodes signals with anywhere from 1 to 10 Mb/s of required bandwidth, varying from frame to frame. It would be difficult for any computer system to keep up with such rapidly varying data rates without this structure.

Figure 8:
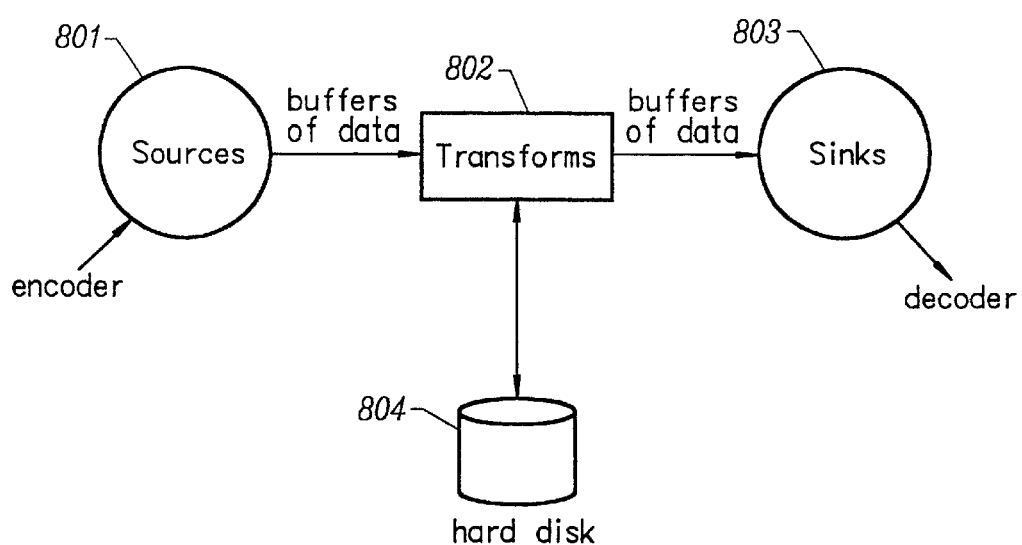
FIG. 8 is a block schematic diagram of a high level view of the program logic according to the invention.

With respect to FIG. 8, the program logic within the CPU has three conceptual components: sources 801, transforms 802, and sinks 803. The sources 801 produce buffers of data. Transforms 802 process buffers of data and sinks 803 consume buffers of data. A transform is responsible for allocating and queuing the buffers of data on which it will operate. Buffers are allocated as if "empty" to sources of data, which give them back "full". The buffers are then queued and given to sinks as "full", and the sink will return the buffer "empty".

A source 801 accepts data from encoders, e.g., a digital satellite receiver. It acquires buffers for this data from the downstream transform, packages the data into a buffer, then pushes the buffer down the pipeline as described above. The source object 801 does not know anything about the rest of the system. The sink 803 consumes buffers, taking a buffer from the upstream transform, sending the data to the decoder, and then releasing the buffer for reuse.

There are two types of transforms 802 used: spatial and temporal. Spatial transforms are transforms that perform, for example, an image convolution or compression/decompression on the buffered data that is passing through. Temporal transforms are used when there is no time relation that is expressible between buffers going in and buffers coming out of a system. Such a transform writes the buffer to a file 804 on the storage medium. The buffer is pulled out at a later time, sent down the pipeline, and properly sequenced within the stream.

Figure 9:
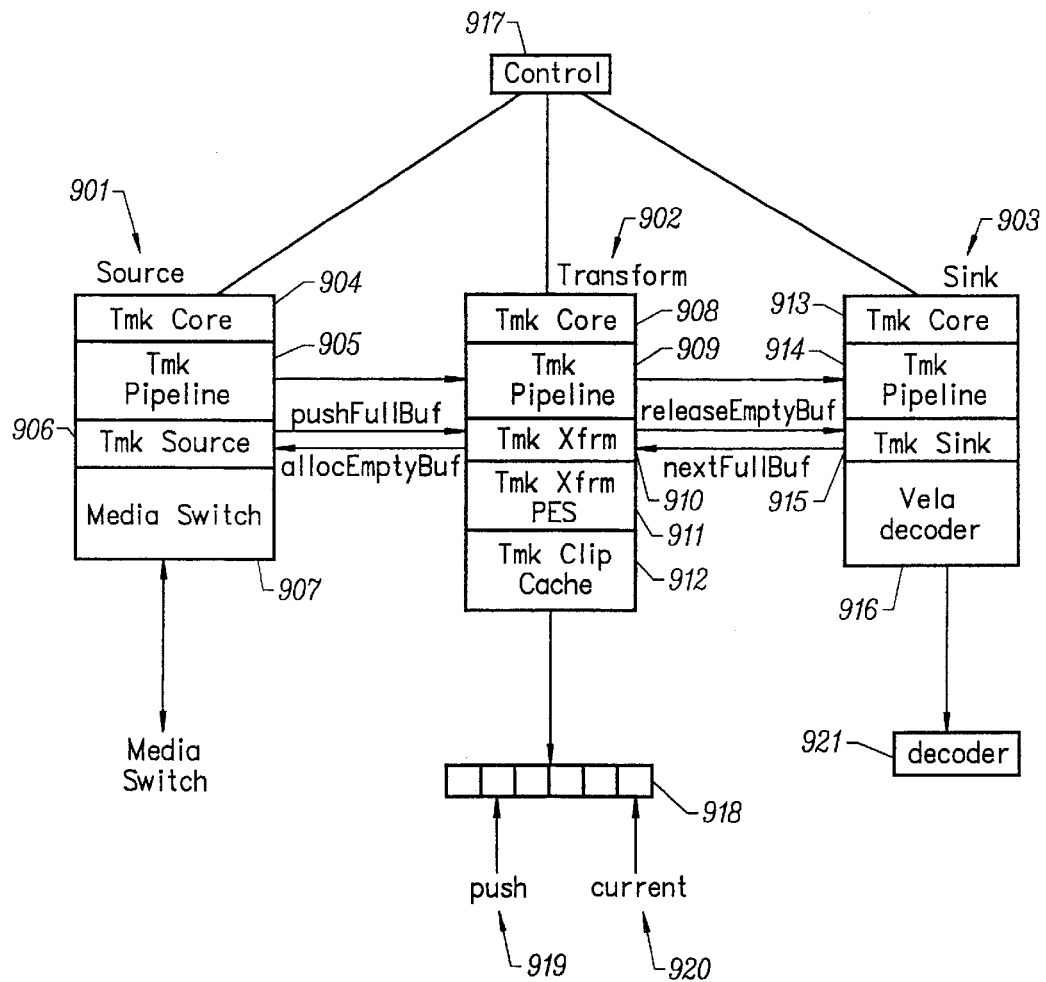
FIG. 9 is a block schematic diagram of a class hierarchy of the program logic according to the invention.

Referring to FIG. 9, a C++ class hierarchy derivation of the program logic is shown. The TiVo Media Kernel (Tmk) 904, 908, 913 mediates with the operating system kernel. The kernel provides operations such as: memory allocation, synchronization, and threading. The TmkCore 904, 908, 913 structures memory taken from the media kernel as an object. It provides operators, new and delete, for constructing and deconstructing the object. Each object (source 901, transform 902, and sink 903) is multi-threaded by definition and can run in parallel.

The TmkPipeline class 905, 909, 914 is responsible for flow control through the system. The pipelines point to the next pipeline in the flow from source 901 to sink 903. To pause the pipeline, for example, an event called "pause" is sent to the first object in the pipeline. The event is relayed on to the next object and so on down the pipeline. This all happens asynchronously to the data going through the pipeline. Thus, similar to applications such as telephony, control of the flow of MPEG streams is asynchronous and separate from the streams themselves. This allows for a simple logic design that is at the same time powerful enough to support the features described previously, including pause, rewind, fast forward and others. In addition, this structure allows fast and efficient switching between stream sources, since buffered data can be simply discarded and decoders reset using a single event, after which data from the new stream will pass down the pipeline. Such a capability is needed, for example, when switching the channel being captured by the input section, or when switching between a live signal from the input section and a stored stream.

The source object 901 is a TmkSource 906 and the transform object 902 is a TmkXfrm 910. These are intermediate classes that define standard behaviors for the classes in the pipeline. Conceptually, they handshake buffers down the pipeline. The source object 901 takes data out of a physical data source, such as the Media Switch, and places it into a PES buffer. To obtain the buffer, the source object 901 asks the down stream object in his pipeline for a buffer (allocEmptyBuf). The source object 901 is blocked until there is sufficient memory. This means that the pipeline is self-regulating; it has automatic flow control. When the source object 901 has filled up the buffer, it hands it back to the transform 902 through the pushFullBuf function.

The sink 903 is flow controlled as well. It calls nextFullBuf which tells the transform 902 that it is ready for the next filled buffer. This operation can block the sink 903 until a buffer is ready. When the sink 903 is finished with a buffer (i.e., it has consumed the data in the buffer) it calls releaseEmptyBuf. ReleaseEmptyBuf gives the buffer back to the transform 902. The transform 902 can then hand that buffer, for example, back to the source object 901 to fill up again. In addition to the automatic flow-control benefit of this method, it also provides for limiting the amount of memory dedicated to buffers by allowing enforcement of a fixed allocation of buffers by a transform. This is an important feature in achieving a cost-effective limited DRAM environment.

The MediaSwitch class 909 calls the allocEmptyBuf method of the TmkClipCache 912 object and receives a PES buffer from it . It then goes out to the circular buffers in the Media Switch hardware and generates PES buffers. The MediaSwitch class 909 fills the buffer up and pushes it back to the TmkClipCache 912 object.

The TmkClipCache 912 maintains a cache file 918 on a storage medium. It also maintains two pointers into this cache: a push pointer 919 that shows where the next buffer coming from the source 901 is inserted; and a current pointer 920 which points to the current buffer used.

The buffer that is pointed to by the current pointer is handed to the Vela decoder class 916. The Vela decoder class 916 talks to the decoder 921 in the hardware. The decoder 921 produces a decoded TV signal that is subsequently encoded into an analog TV signal in NTSC, PAL or other analog format. When the Vela decoder class 916 is finished with the buffer it calls releaseEmptyBuf.

The structure of the classes makes the system easy to test and debug. Each level can be tested separately to make sure it performs in the appropriate manner, and the classes may be gradually aggregated to achieve the desired functionality while retaining the ability to effectively test each object.

The control object 917 accepts commands from the user and sends events into the pipeline to control what the pipeline is doing. For example, if the user has a remote control and is watching TV, the user presses pause and the control object 917 sends an event to the sink 903, that tells it pause. The sink 903 stops asking for new buffers. The current pointer 920 stays where it is at. The sink 903 starts taking buffers out again when it receives another event that tells it to play. The system is in perfect synchronization; it starts from the frame that it stopped at.

The remote control may also have a fast forward key. When the fast forward key is pressed, the control object 917 sends an event to the transform 902, that tells it to move forward two seconds. The transform 902 finds that the two second time span requires it to move forward three buffers. It then issues a reset event to the downstream pipeline, so that any queued data or state that may be present in the hardware decoders is flushed. This is a critical step, since the structure of MPEG streams requires maintenance of state across multiple frames of data, and that state will be rendered invalid by repositioning the pointer. It then moves the current pointer 920 forward three buffers. The next time the sink 903 calls nextFullBuf it gets the new current buffer. The same method works for fast reverse in that the transform 902 moves the current pointer 920 backwards.

A system clock reference resides in the decoder. The system clock reference is sped up for fast play or slowed down for slow play. The sink simply asks for full buffers faster or slower, depending on the clock speed.

Figure 10:
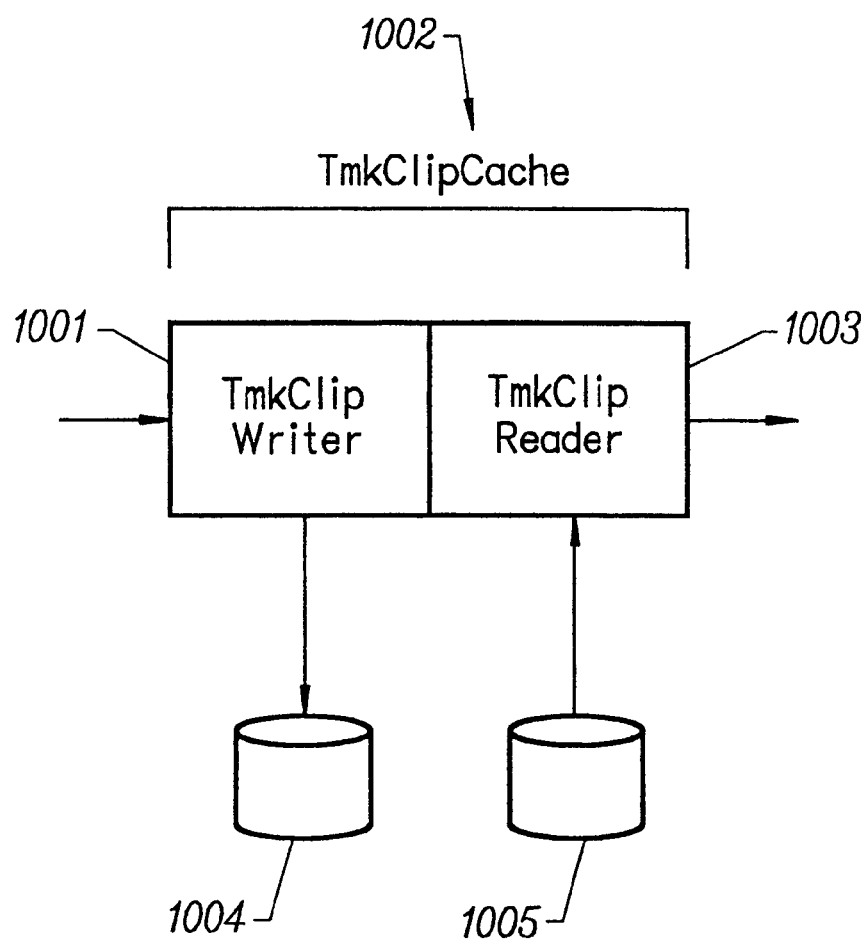
FIG. 10 is a block schematic diagram of a preferred embodiment of the clip cache component of the invention according to the invention.

With respect to FIG. 10, two other objects derived from the TmkXfrm class are placed in the pipeline for disk access. One is called TmkClipReader 1003 and the other is called TmkClipWriter 1001. Buffers come into the TmkClipWriter 1001 and are pushed to a file on a storage medium 1004. TmkClipReader 1003 asks for buffers which are taken off of a file on a storage medium 1005. A TmkClipReader 1003 provides only the allocEmptyBuf and pushFullBuf methods, while a TmkClipWriter 1001 provides only the nextFullBuf and releaseEmptyBuf methods. A TmkClipReader 1003 therefore performs the same function as the input, or "push" side of a TmkClipCache 1002, while a TmkClipWriter 1001 therefore performs the same function as the output, or "pull" side of a TmkClipCache 1002.

Figure 11:
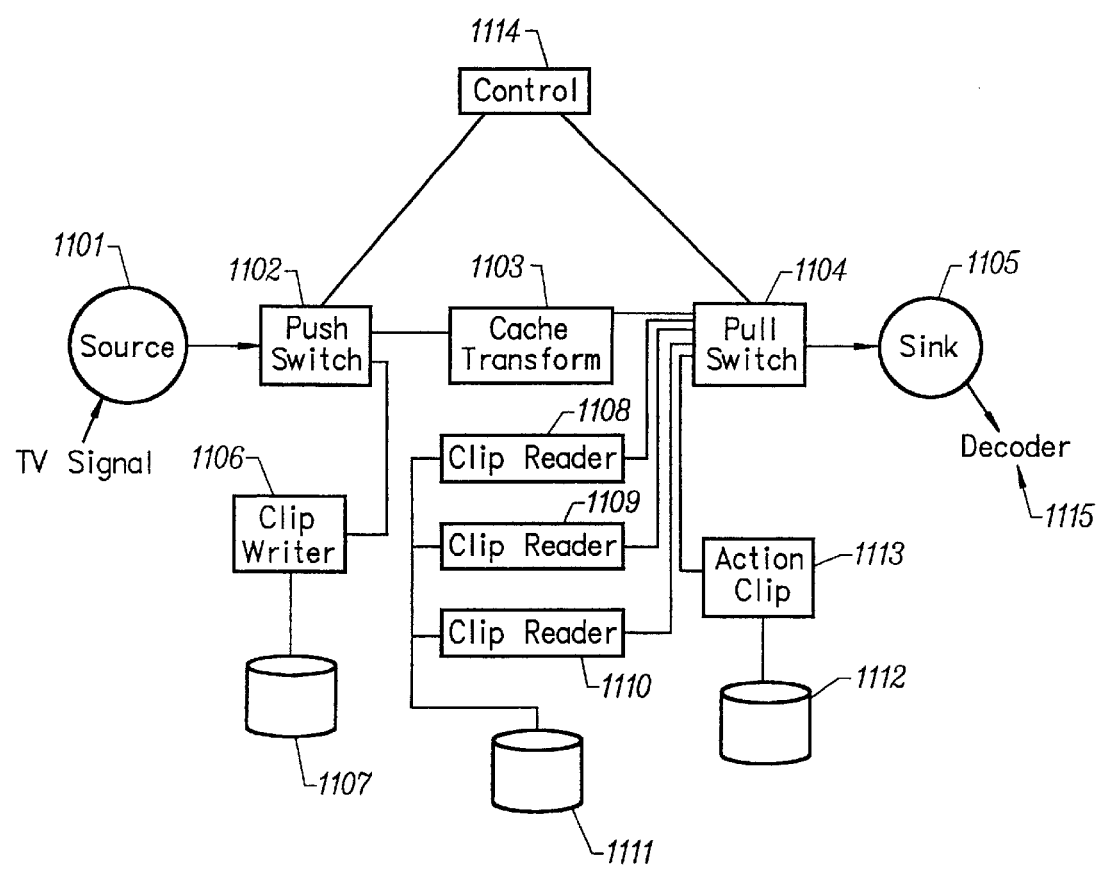
FIG. 11 is a block schematic diagram of a preferred embodiment of the invention that emulates a broadcast studio video mixer according to the invention.

Referring to FIG. 11, a preferred embodiment that accomplishes multiple functions is shown. A source 1101 has a TV signal input. The source sends data to a PushSwitch 1102 which is a transform derived from TmkXfrm. The PushSwitch 1102 has multiple outputs that can be switched by the control object 1114. This means that one part of the pipeline can be stopped and another can be started at the users whim. The user can switch to different storage devices. The Push- Switch 1102 could output to a TmkClipWriter 1106, which goes onto a storage device 1107 or write to the cache transform 1103.

An important feature of this apparatus is the ease with which it can selectively capture portions of an incoming signal under the control of program logic. Based on information such as the current time, or perhaps a specific time span, or perhaps via a remote control button press by the viewer, a TmkClipWriter 1106 may be switched on to record a portion of the signal, and switched off at some later time This switching is typically caused by sending a "switch" event to the PushSwitch 1102 object.

An additional method for triggering selective capture is through information modulated into the VBI or placed into an MPEG private data channel. Data decoded from the VBI or private data channel is passed to the program logic. The program logic examines this data to determine if the data indicates that capture of the TV signal into which it was modulated should begin. Similarly, this information may also indicate when recording should end, or another data item may be modulated into the signal indicating when the capture should end. The starting and ending indicators may be explicitly modulated into the signal or other information that is placed into the signal in a standard fashion may be used to encode this information.

Figure 12:
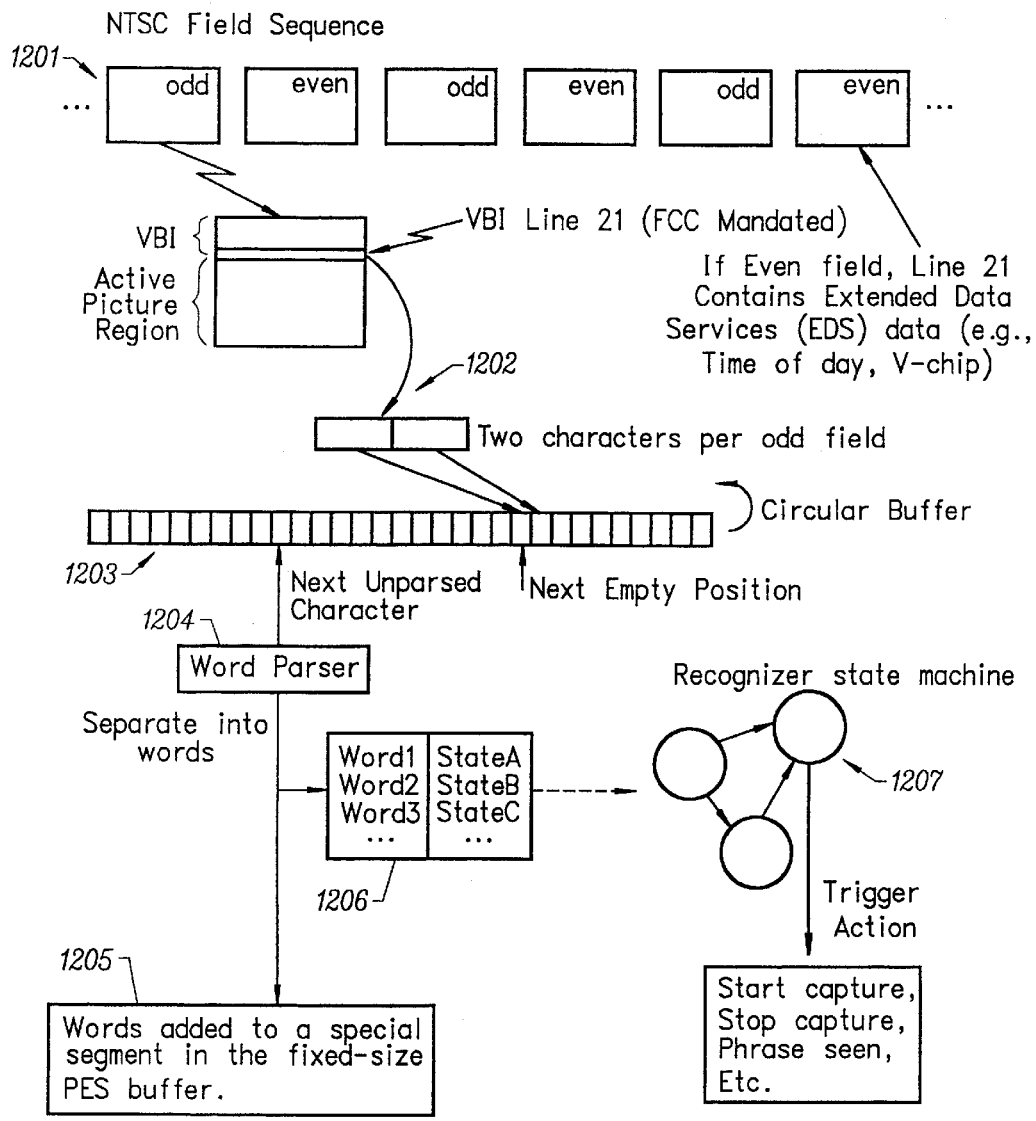
FIG. 12 is a block schematic diagram of a closed caption parser according to the invention.

With respect to FIG. 12, an example is shown which demonstrates how the program logic scans the words contained within the closed caption (CC) fields to determine starting and ending times, using particular words or phrases to trigger the capture. A stream of NTSC or PAL fields 1201 is presented. CC bytes are extracted from each odd field 1202, and entered in a circular buffer 1203 for processing by the Word Parser 1204. The Word Parser 1204 collects characters until it encounters a word boundary, usually a space, period or other delineating character. Recall from above, that the MPEG audio and video segments are collected into a series of fixed-size PES buffers. A special segment is added to each PES buffer to hold the words extracted from the CC field 1205. Thus, the CC information is preserved in time synchronization with the audio and video, and can be correctly presented to the viewer when the stream is displayed. This also allows the stored stream to be processed for CC information at the leisure of the program logic, which spreads out load, reducing cost and improving efficiency. In such a case, the words stored in the special segment are simply passed to the state table logic 1206.

During stream capture, each word is looked up in a table 1206 which indicates the action to take on recognizing that word. This action may simply change the state of the recognizer state machine 1207, or may cause the state machine 1207 to issue an action request, such as "start capture", "stop capture", "phrase seen", or other similar requests. Indeed, a recognized word or phrase may cause the pipeline to be switched; for example, to overlay a different audio track if undesirable language is used in the program.

Note that the parsing state table 1206 and recognizer state machine 1207 may be modified or changed at any time. For example, a different table and state machine may be provided for each input channel. Alternatively, these elements may be switched depending on the time of day, or because of other events.

Referring to FIG. 11, a PullSwitch is added 1104 which outputs to the sink 1105. The sink 1105 calls nextFullBuf and releaseEmptyBuf to get or return buffers from the PullSwitch 1104. The PullSwitch 1104 can have any number of inputs. One input could be an ActionClip 1113. The remote control can switch between input sources. The control object 1114 sends an event to the PullSwitch 1104, telling it to switch. It will switch from the current input source to whatever input source the control object selects.

An ActionClip class provides for sequencing a number of different stored signals in a predictable and controllable manner, possibly with the added control of viewer selection via a remote control. Thus, it appears as a derivative of a TmkXfrm object that accepts a "switch" event for switching to the next stored signal.

This allows the program logic or user to create custom sequences of video output. Any number of video segments can be lined up and combined as if the program logic or user were using a broadcast studio video mixer. TmkClipReaders 1108, 1109, 1110 are allocated and each is hooked into the PullSwitch 1104. The PullSwitch 1104 switches between the TmkClipReaders 1108, 1109, 1110 to combine video and audio clips. Flow control is automatic because of the way the pipeline is constructed. The Push and Pull Switches are the same as video switches in a broadcast studio.

The derived class and resulting objects described here may be combined in an arbitrary way to create a number of different useful configurations for storing, retrieving, switching and viewing of TV streams. For example, if multiple input and output sections are available, one input is viewed while another is stored, and a picture-in-picture window generated by the second output is used to preview previously stored streams. Such configurations represent a unique and novel application of software transformations to achieve the functionality expected of expensive, sophisticated hardware solutions within a single cost-effective device.

Figure 13:
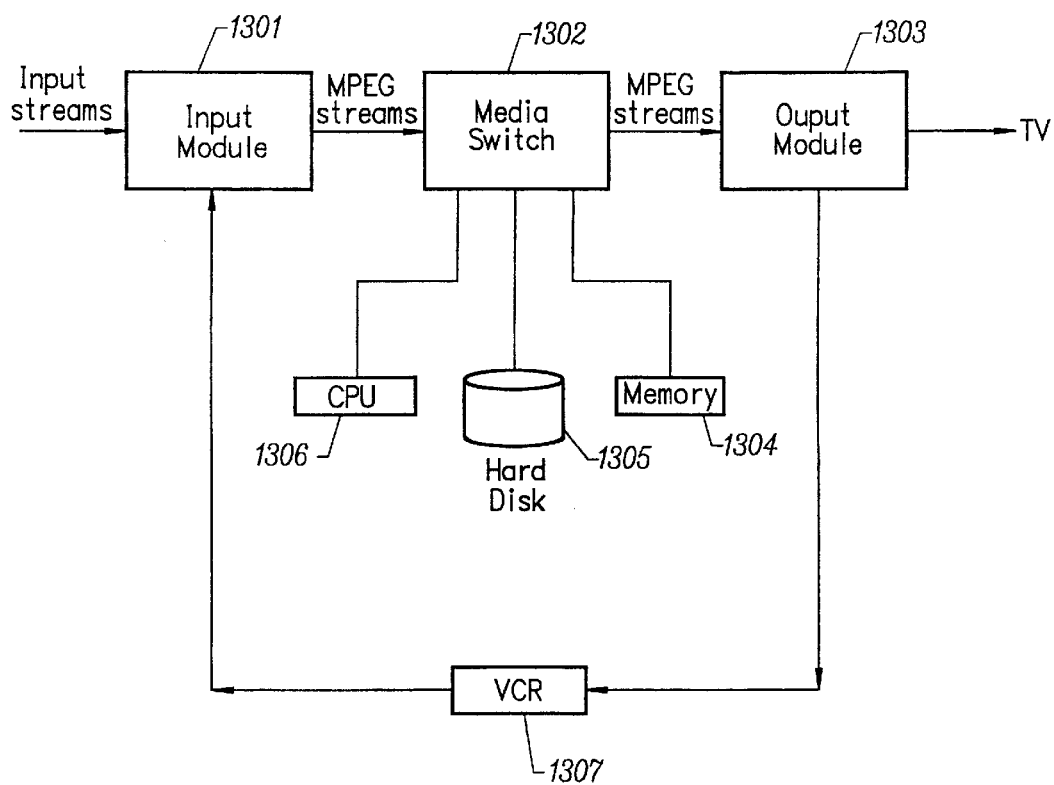
FIG. 13 is a block schematic diagram of a high level view of a preferred embodiment of the invention utilizing a VCR as an integral component of the invention according to the invention.

With respect to FIG. 13, a high-level system view is shown which implements a VCR backup. The Output Module 1303 sends TV signals to the VCR 1307. This allows the user to record TV programs directly on to video tape. The invention allows the user to queue up programs from disk to be recorded on to video tape and to schedule the time that the programs are sent to the VCR 1307. Title pages (EPG data) can be sent to the VCR 1307 before a program is sent. Longer programs can be scaled to fit onto smaller video tapes by speeding up the play speed or dropping frames.

The VCR 1307 output can also be routed back into the Input Module 1301. In this configuration the VCR acts as a backup system for the Media Switch 1302. Any overflow storage or lower priority programming is sent to the VCR 1307 for later retrieval.

The Input Module 1301 can decode and pass to the remainder of the system information encoded on the Vertical Blanking Interval (VBI). The Output Module 1303 can encode into the output VBI data provided by the remainder of the system. The program logic may arrange to encode identifying information of various kinds into the output signal, which will be recorded onto tape using the VCR 1307. Playing this tape back into the input allows the program logic to read back this identifying information, such that the TV signal recorded on the tape is properly handled. For example, a particular program may be recorded to tape along with information about when it was recorded, the source network, etc. When this program is played back into the Input Module, this information can be used to control storage of the signal, presentation to the viewer, etc.

One skilled in the art will readily appreciate that such a mechanism may be used to introduce various data items to the program logic which are not properly conceived of as television signals. For instance, software updates or other data may be passed to the system. The program logic receiving this data from the television stream may impose controls on how the data is handled, such as requiring certain authentication sequences and/or decrypting the embedded information according to some previously acquired key. Such a method works for normal broadcast signals as well, leading to an efficient means of providing non-TV control information and data to the program logic.

Additionally, one skilled in the art will readily appreciate that although a VCR is specifically mentioned above, any multimedia recording device (e.g., a Digital Video Disk-Random Access Memory (DVD-RAM) recorder) is easily substituted in its place.

One skilled in the art will readily appreciate that other applications may be substituted for those set forth herein without departing from the spirit and scope of the present invention. For example, the invention can be used in the detection of gambling casino crime. The input section of the invention is connected to the casino's video surveillance system. Recorded video is cached and simultaneously output to external VCRs. The user can switch to any video feed and examine (i.e., rewind, play, slow play, fast forward, etc.) a specific segment of the recorded video while the external VCRs are being loaded with the real-time input video.

Referring again to FIG. 1, a preferred embodiment of the invention provides a viewer interface that allows the viewer to access different functions of the system. The system's construct allows items called video loopsets to be stored on the hard disk or storage device 105. The video loopsets enter the system through input streams into the Input Module 101 and converted to MPEG streams and placed onto the storage device by the Media Switch 102. The video loopsets also enter the system in the form of MPEG streams (through a backchannel, VBI, transmission media, etc.), bypass the MPEG conversion cycle by the Input Module 101 and are written to the storage device 105 by the Media Switch 102.

The viewer interface program logic (executed by the CPU 106) commands the Media Switch 102 to retrieve a video loopset from the storage device 105. A video loopset is a three to four second (the length is dependent upon the amount of information displayed and can be longer) loop of video is created so that the ending and beginning seamlessly merge together to give the effect of a continuous video stream as the system plays the loopset from beginning to end, looping back to the beginning of the loopset each time the end is reached. As detailed above, the Output Section 103 takes MPEG video loopset streams as input and produces an analog TV signal according to the NTSC, PAL, or other required TV standards. The Output Section's 103 OSD generator allows the program logic to overlay text and graphics on top of the resulting analog TV signal.

A lower level viewpoint of the system is shown in FIG. 7. The CPU 713 tells the Media Switch 701 that a specific video loopset must be retrieved from the storage device 710 and sent to the MPEG decoder 715. On screen displays are created by the CPU 713 and routed through the OSD generator to the digital mixer 718. The digital mixer 718 allows video loopsets, on screen displays, and audio cues to be mixed and sent to the TV or monitor 716.

Figure 14:
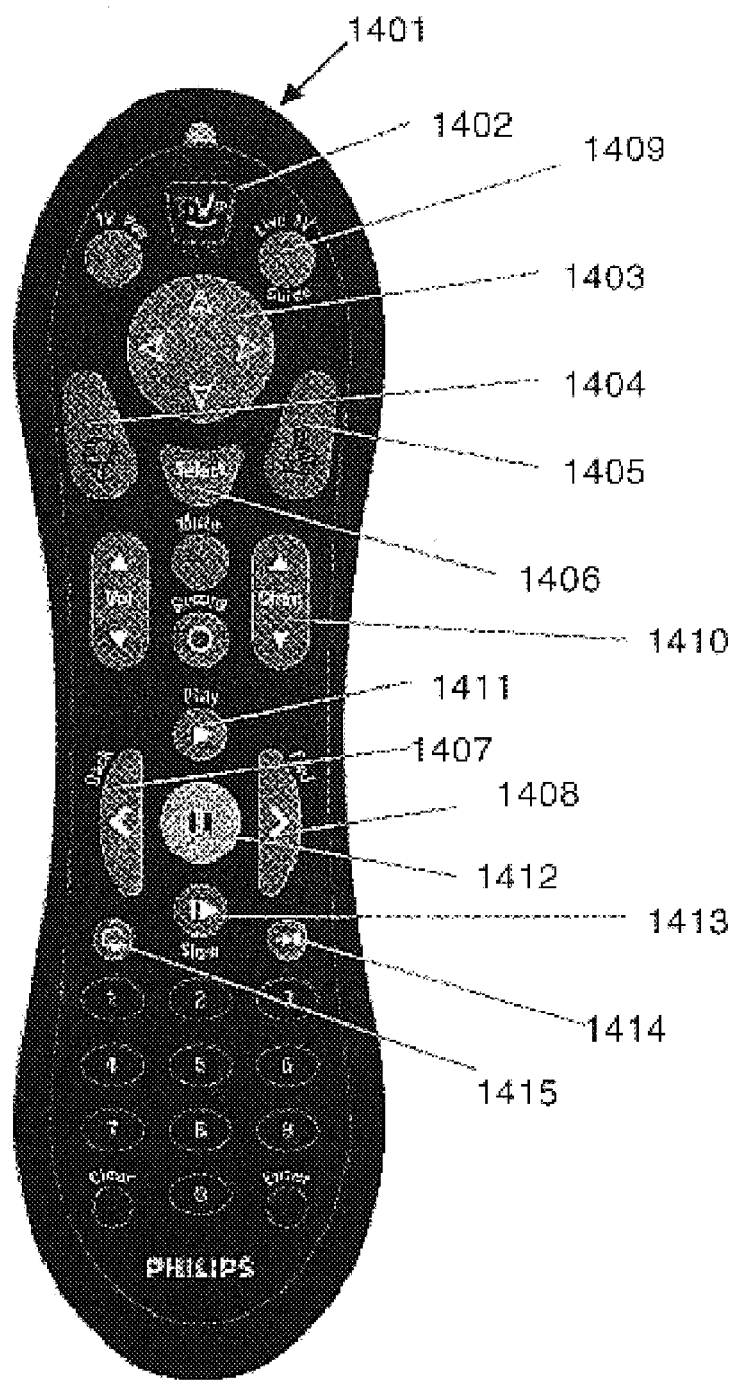
FIG. 14 is a diagram of a remote control according to the invention.

The invention's viewer interface reacts to user input through an input device such as the exemplary remote control shown in FIG. 14. With respect to FIG. 15, the user's commands are processed through the Control Input Module 1504. The viewer interface 1503 processes the input commands. Appropriate commands are issued (such as displaying loopsets) to the Media Control 1501. On screen displays are generated by the viewer interface 1503 and routed through the Output Module 1505 as described above.

Figure 16:
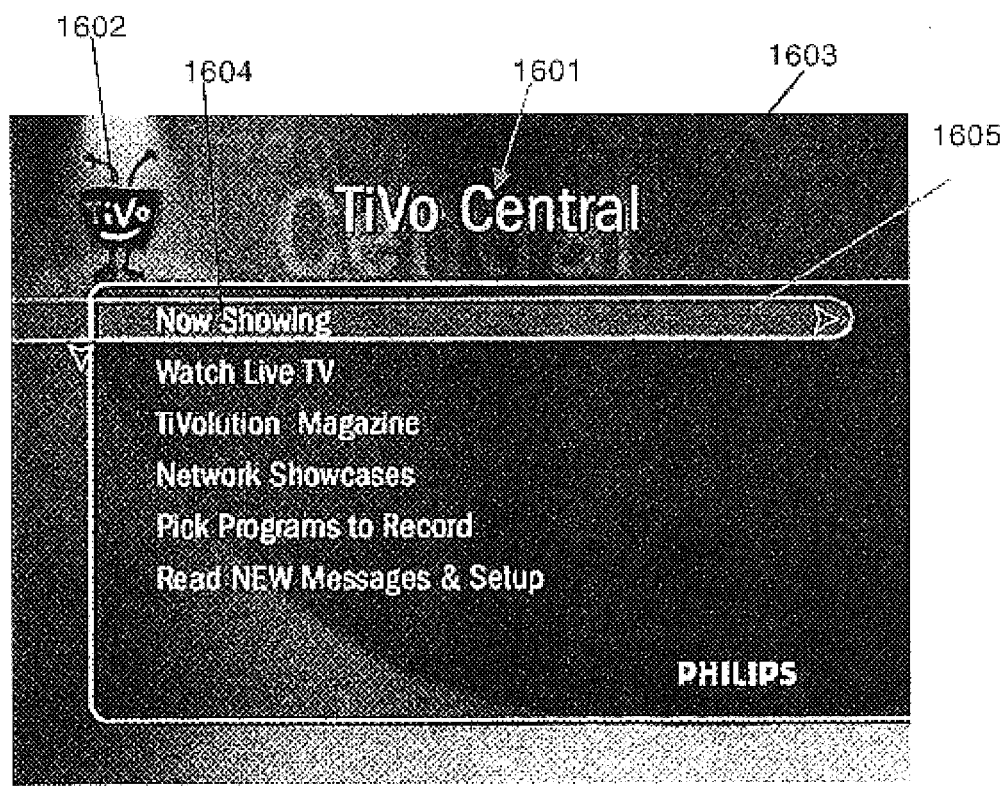
FIG. 16 is a schematic diagram of a central menu screen according to the invention.

A viewer using this type of remote control 1401 presses the TiVo button 1401 and the viewer interface displays a menu as shown in FIG. 16. TiVo Central 1601 is a central location that contains a list of areas that the viewer can visit and is easily accessed through a single button push on the remote control.

The viewer interface displays video loopsets in the background area of the screen on a TV or monitor. Here, the character 1602 in the upper left-hand portion of the screen is a separate video loopset. The character's loopset animates the character 1602 by giving the viewer the sense that the character is alive. His antennae move and he rocks from side to side on his feet. Each element of the screen can be a separate video loopset. The subdued text's 1603 loopset rotates the text in a banner-like mode from the right side of the screen to the left side. The rest of the background details are on another loopset. One loopset can be used for the entire background display if so desired. Video loopsets free the CPU from having to draw continuous animations. The system simply plays the loopsets in the same manner as playing any other MPEG stream, thereby offloading the CPU. Additionally, video loopsets are an inexpensive method of displaying high resolution graphics.

Any temporal elements (e.g., names, icons, location indicators) are drawn onto the screen over the video loops using the OSD. Menu items such as Now Showing 1604 are drawn over the video loopset. A highlight bar 1605 is used to indicate the current menu item that can be selected by the user.

Highlight bars can be displayed using video loopsets. The highlight bar 1605 appears to be drawn onto the screen but is actually a video loopset. Each time the user presses a button 1403 on the remote control to move the highlight bar 1605, an appropriate video loopset is selected for that position.

Alternatively, the highlight bar 1605 can be drawn over the video loopsets in the same manner as a temporal item.

Information is presented in a successive disclosure format. The user navigates through menus by moving to the right (by pressing right side of the button 1403 on the remote control) to obtain more information or to the left (by pressing the left side of the button 1403 on the remote control) to see less information and return to the previous location. The select button 1404 selects the menu item and causes the appropriate action to be executed.

The background colors of each set of menus remains consistent throughout the user's experience. For example, the background screen color for Now Showing is amber/yellow and the background screen color for Network Showcases is purple. The user intuitively knows what menu area he is in through the color cues.

Figure 17:
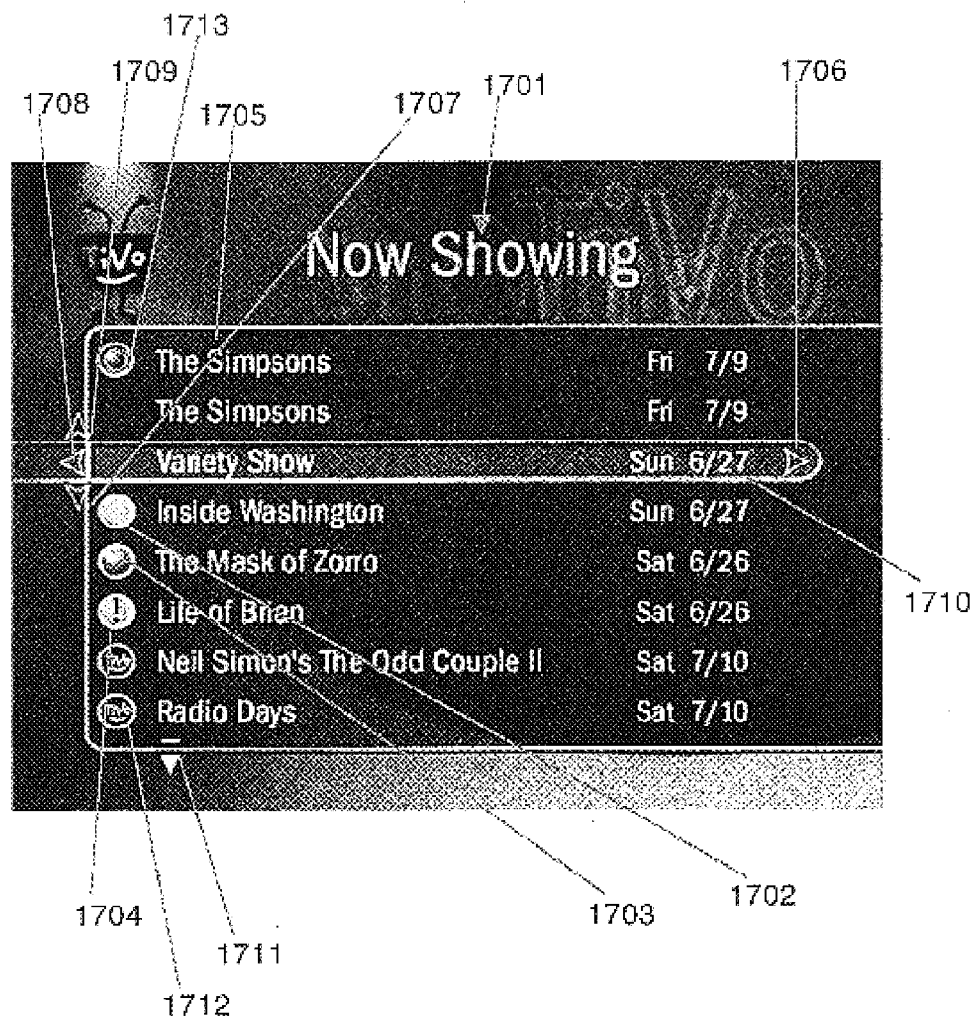
FIG. 17 is a schematic diagram of a program list screen according to the invention.

Referring to FIGS. 14, 16, and 17, the invention provides "whispering arrows" 1706, 1707, 1708, 1709 on each screen that tell the user that more information is available in that particular direction. These arrows point up 1709, down 1707, left 1708, and right 1706. A right arrow 1706 indicates that there is more detailed content that the user can access by pressing the right side of the button 1403 on the remote control 1401. A left arrow 1708 indicates that a more general level of detail exists that the user can access by pressing the left side of the button 1403 on the remote control 1401. Up 1709 and down 1707 arrows indicate that the current list has more items above or below, respectively, from the location that the user currently has highlighted with the highlight bar

1710. If an arrow does not exist, then there is nowhere else to go in that direction.

For example, the user simply highlights the Now Showing name 1604 and presses the right side of the button 1403 on the remote control 1401. The Now Showing screen 1701 is shown which has a list of programs 1705 that are displayed to the user in descending order with the most recently obtained program at the top of the list. The Now Showing listing 1705 contains a list of shows that the user requested the system to record and also programs that the system believes are of interest to the user. The system's list is based upon the program preferences that the user has expressed to the system using the thumbs up and thumbs down ratings described below and are indicated with a TiVo logo 1712. A yellow dot 1702 is a warning indicator that indicates that a program is going to expire and will be deleted from the hard drive in a short time (e.g., in 24 hours). A yellow dot with an exclamation point 1704 indicates that a program will be deleted within a much shorter time (e.g., within the next few hours). Green dots 1703 indicate that the system will save the program until the user explicitly deletes it. A red dot 1713 indicates that the program is currently being saved on the storage device.

A down arrow 1711 is displayed in the lower area of the listing 1705 whenever the user has more information to scroll or page down through. An up arrow is displayed in the upper area of the listing 1705 whenever there is more information to scroll or page up through. The user presses up or down on the button 1403 on the remote control 1401 to scroll up or down, respectively, through the listing. The channel button 1410 is pressed up or down to page up or down, respectively, through the listing.

Figure 18:
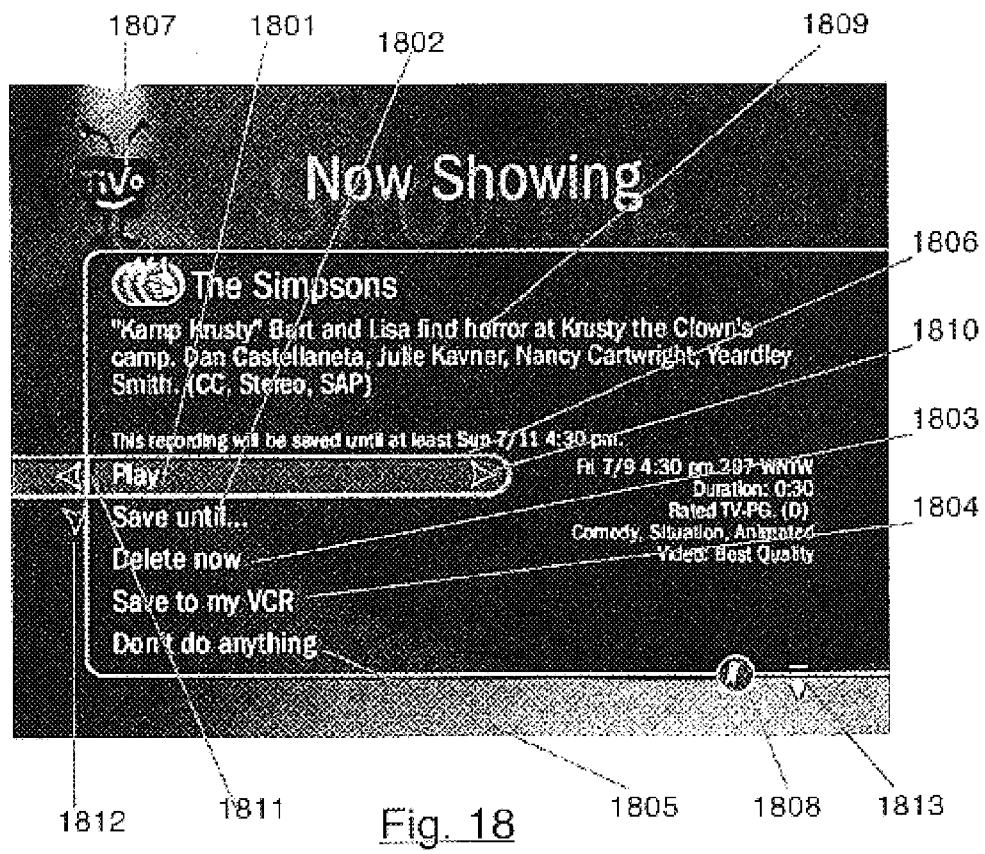
FIG. 18 is a schematic diagram of a detailed program information screen according to the invention.
Figure 19:
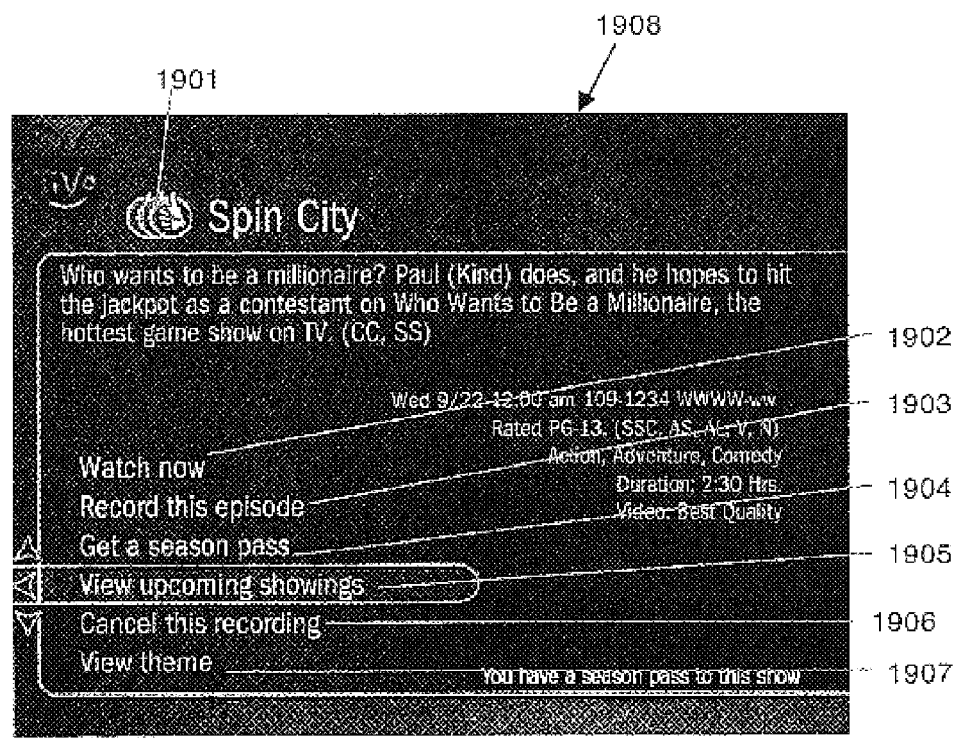
FIG. 19 is a schematic diagram of a detailed program information screen according to the invention.
Figure 20A:
FIG. 20a is a schematic diagram of a small banner displayed over program content according to the invention.
Figure 20B:
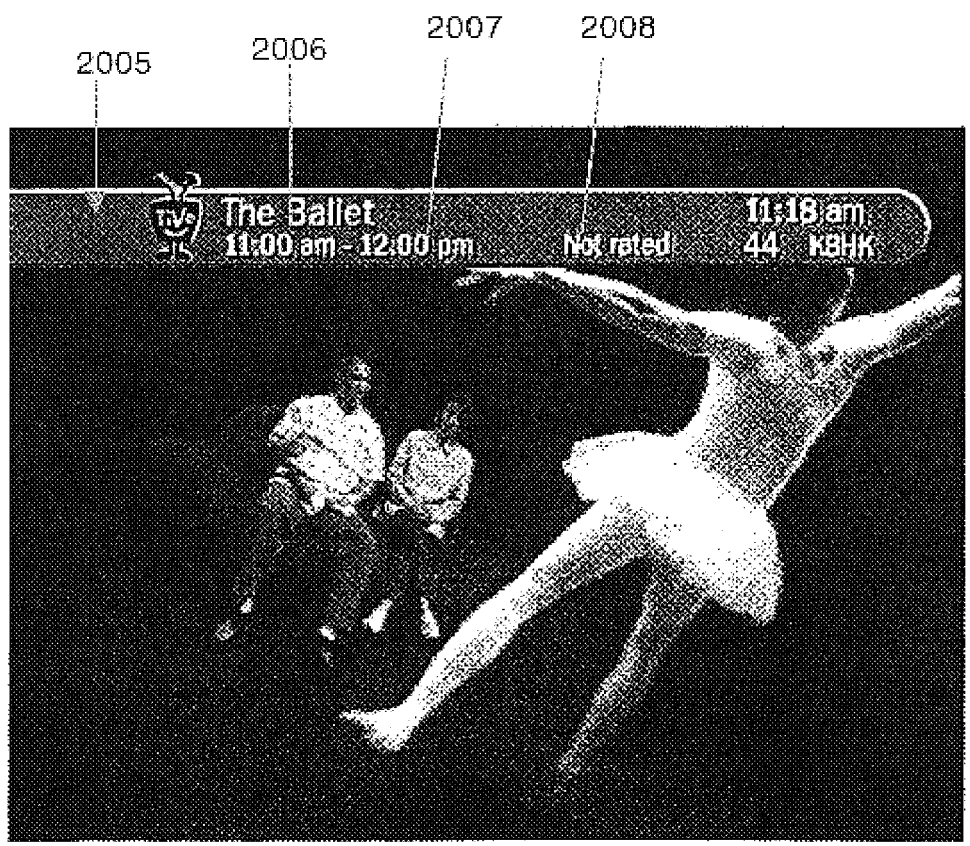
FIG. 20b is a schematic diagram of a medium banner displayed over program content according to the invention.
Figure 20C:
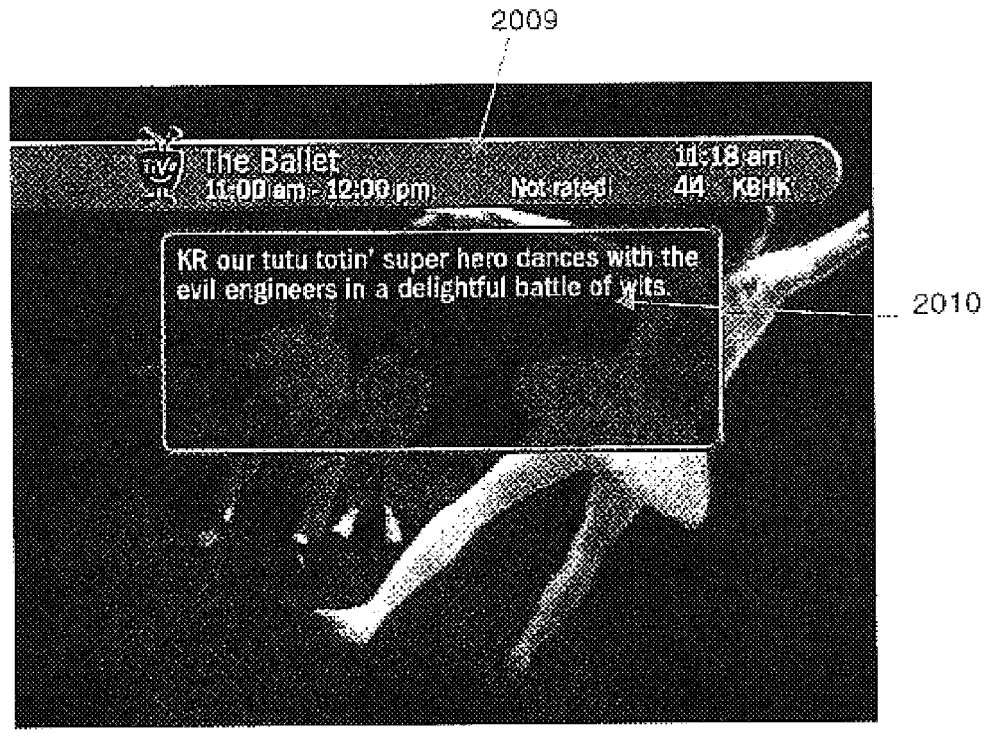
FIG. 20c is a schematic diagram of a detailed banner displayed over program content according to the invention.

When the user presses on the right side of the button 1403 on the remote control 1401, a more detailed program information screen is displayed to the user. Referring to FIG. 18, this screen supplies the user with more information related to the particular program. The user can choose to let the program be deleted automatically by taking no action 1805, view it immediately 1801, delete it immediately 1803, ask the invention to save the program longer 1802, or save until deleted by the user 1802. If the user asks the invention to save the program longer, then the yellow or yellow dot with an exclamation point will disappear. The user can also save a program to an external VCR for archiving 1805. The invention consistently displays the highlight bar 1806, whispering arrows 1810, 1811, 1812, and video loopsets 1807. A text description of the program 1809 is displayed.

A down arrow 1813 is shown in the lower portion of the screen to indicate that the user can press down on the channel button 1410 on the remote control 1401 to see a detailed program information screen for the next program on the Now Showing list. An up arrow displayed in the upper portion of the screen area indicates that the program list has additional programs in that direction. This functionality allows the user to obtain the same information shown in the Now Showing listing 1705 in a more detailed format.

Figure 15:
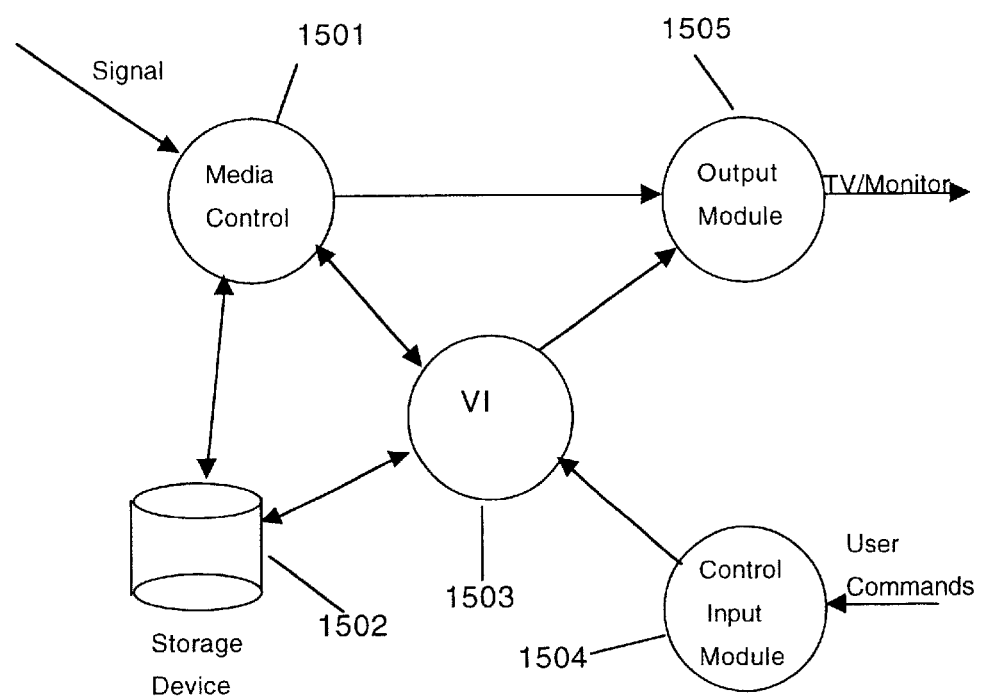
FIG. 15 is a block schematic diagram of a high level view of a preferred embodiment of the invention showing the viewer interface module interaction according to the invention.

With respect to FIGS. 7, 15, and 18, the invention provides a bookmark function that allows the user to bookmark a program where he left off. The CPU 713 records the frame of the program where the user stopped or the user commands the system to place a bookmark. The Media Switch 701 updates the CPU 713 on the status of the video stream. For example, a user can watch the first half-hour of a two-hour program stored in the storage device 710 and then bookmark the program where he left off or he can place bookmarks within the program to mark points of interest.

Alternatively, the invention automatically bookmarks the program for the user if the user exits viewing the program by going to live TV or to the menu mode. The invention places an indicator 1708 on the screen, indicating that a bookmark has been saved.

The user can, at any time, access any of his bookmarks and continue viewing the program from the bookmark. When a program is deleted from the storage device 710, the associated bookmark(s) is also deleted. The user can also select and delete a specific bookmark or all bookmarks for a program. Once the program is playing, the user can jump to a bookmark using the jump button 1414 on the remote control 1401 and press the select button 1406 to remove the bookmark. A bookmark is placed in the same manner by pressing the select button 1406 to create a bookmark.

Bookmarks within a single program can be set for different users. Remote controls are encoded for a specific user in a household. This allows each person in the household to have a personal remote control. The advantage to having individual remote controls is that parental controls, personal preferences, and bookmarks are automatically activated when each remote control is used. The CPU 713 notes that a bookmark belongs to a certain encoded remote control. Each set of data are stored on the storage device 710.

The remote control identifies itself to the system via a coded chip onboard the remote control. The Control Input Module 1504 receives the remote control's command signals. The viewer interface 1503 processes the remote control's identification and checks the preferences on the storage device 1502 for any associated preference files. The viewer interface 1503 then uses the associated preference file (or default preference file if no match was found) bookmark information for the user. Any bookmarks that do not have associated programs stored on the storage device 1502 are ignored and deleted. The viewer interface 1503 commands the Media Control 1501 to display programs with start frames corresponding to the preference file bookmarks, if they exist.

The encoded remote control can also be used for parental controls. Specific remote control(s) can be set up so that different levels of parental controls are engaged for each remote control. Children, for example, will have their own personal remote controls that are set up to not allow them to watch any shows with greater than a G-rating.

One skilled in the art will readily appreciate that, although coded remote controls are mentioned as a method of accessing individual user preference files, other methods such as manual selection can be used.

Multiple bookmarks for a program are transparent to the user because the remote control that the user uses tells the system to only display and activate that particular user's bookmarks. A user can also see other users' bookmarks if so desired.

One skilled in the art will readily appreciate that the invention's bookmarks can be applied to any video or audio application where the physical position in the material is readily ascertainable e.g., DVDs, VCRs, MP3s, etc.

Users can indicate their preferences for a certain program. A user can rate a particular program with either one, two, or three thumbs up, indicating the degree that he likes the program. One, two, or three thumbs down are used to indicate the degree that the user dislikes the program. The degree that the user likes or dislikes the program increases as the number of thumbs up or down increases (i.e., two thumbs up indicates a stronger preference than one thumbs up).

The user can rate a program while he is watching it or viewing the program's information. The accumulation of program ratings allows the system to save related programs onto the system storage device. This influences the performance of the underlying system as described in application no. 08/ owned by the applicant.

Referring to FIGS. 19, 20*a*, 20*b*, and 20*c* the invention displays the thumbs rating (if it exists) 1901 for a particular program to the user whenever an episode of the program is viewed or the user looks at the program information 1908. A banner 2001 is displayed in the upper region of the screen whenever the user changes channels, transitions to live TV, or commands the banner to be displayed.

The user can rotate through three different levels of banners, each successively containing more information about the program. The lowest level banner 2001 contains minimal information such as channel 2002, station ID 2003, and time 2004. The second level banner 2005 displays, in addition to the information in the minimal banner 2001, information such as program title 2006, duration 2007, program MPAA or TV rating 2008, and thumbs rating. The final level banner 2009 adds program text description 2010 to the second level banner 2005. The program text description 2010 is semi-transparent, allowing the user to watch the progress of the program while reading the text.

Figure 21:
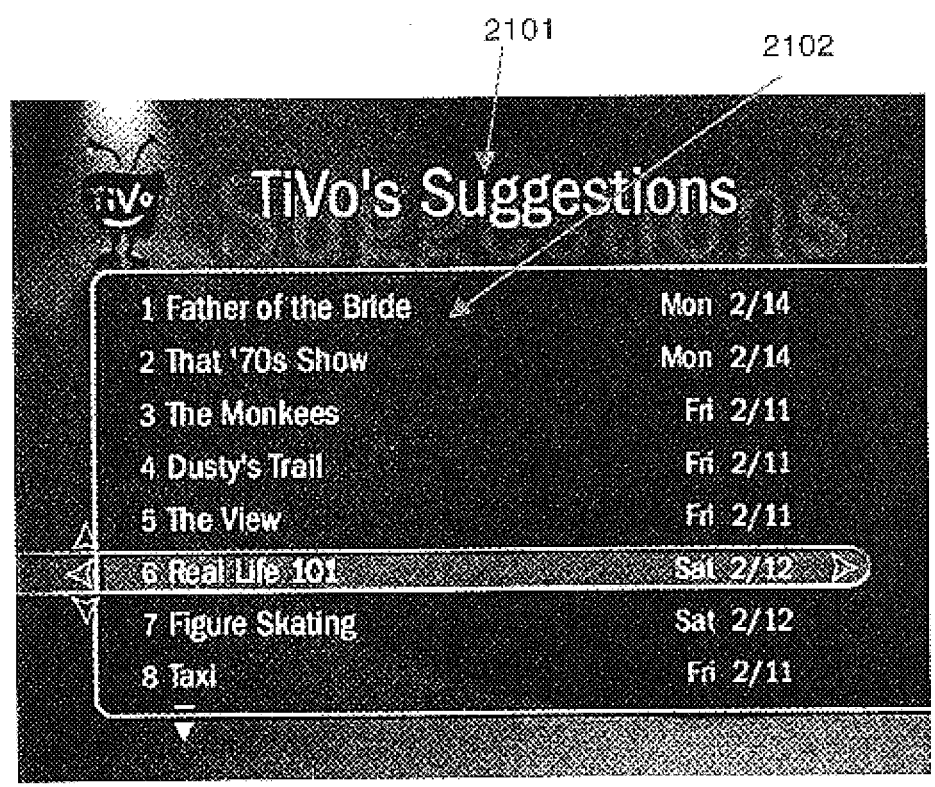
FIG. 21 is a schematic diagram of a suggested program list screen according to the invention.

With respect to FIG. 21, programs that the user has indicated a preference for and other programs that the system believes that the user is interested in (through a user profile) are displayed 2102 in the TiVo's Suggestions area 2101.

The user can tell the system to record one instance of a program, the next x number of showings, record all occurrences of a program for a set time period, or get a season pass for a program. A season pass tells the system that the user wants to record each airing of a certain program for the entire season. The system notes, for example, that the program is shown every Monday at 8:00 PM and saves the program on the storage device every Monday at 8:00 PM until the end of the season. A season pass will only be offered to the user if the program is episodic in nature.

At anytime during the viewing of live television, the user is able to tell the system to save the program in progress, record the program the next time, if any, it is shown, or get a season pass for the program. If the user is watching a show and tells the system to record the program in progress, then the system will record the program from that point on and will add onto the saved recording (prepending) the portion of the program that has already passed and has been buffered. The user's choices will appear in his profile so he can edit it later.

Figure 22:
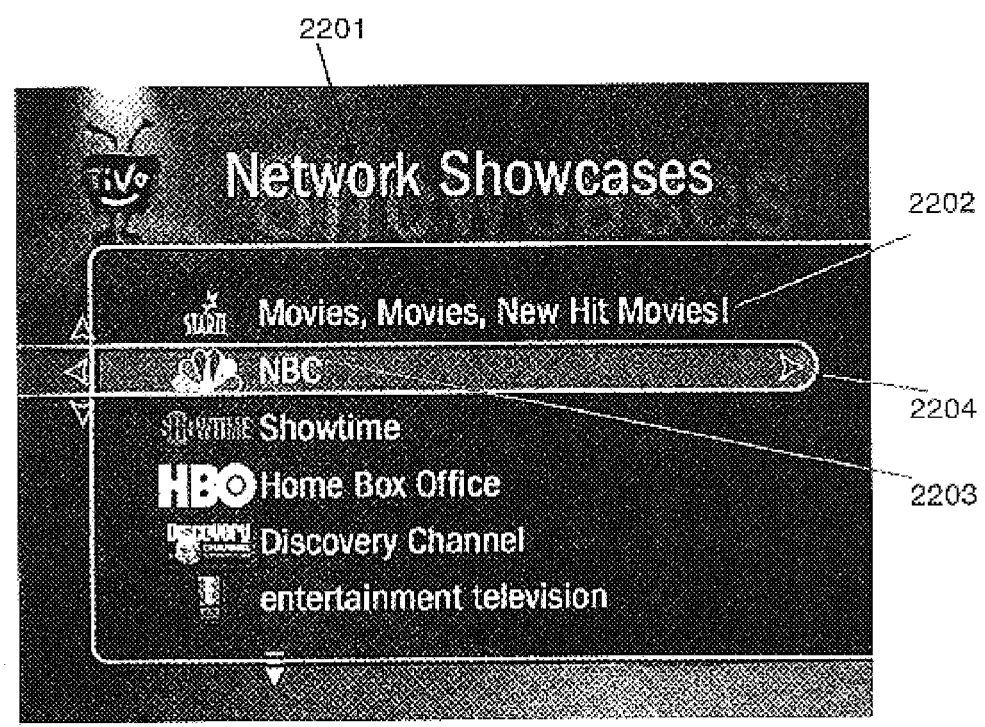
FIG. 22 is a schematic diagram of a network listing screen according to the invention.
Figure 23:
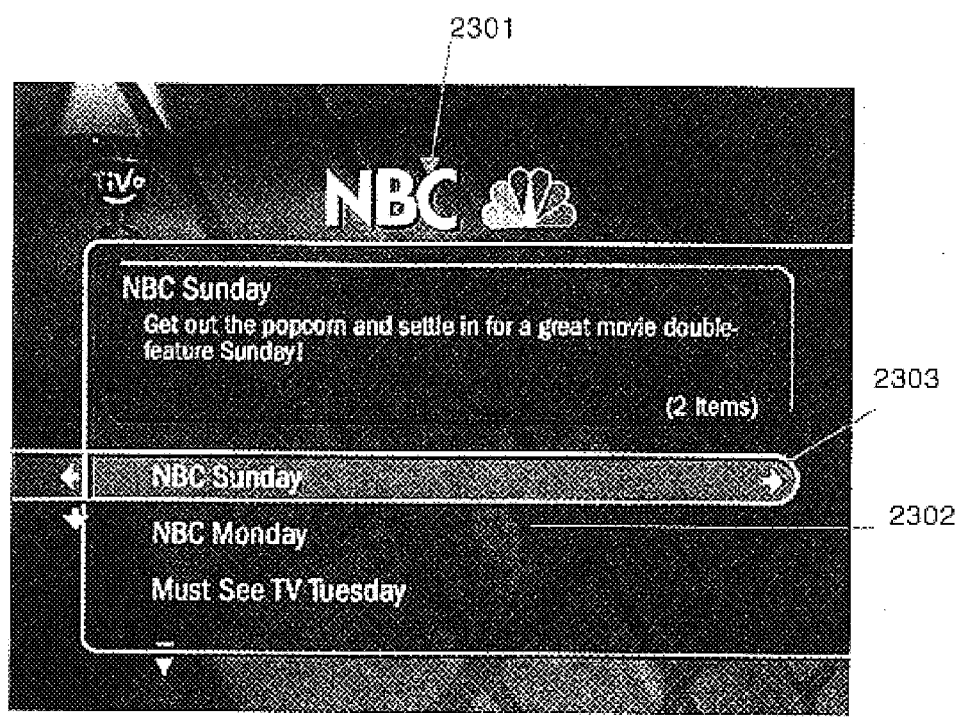
FIG. 23 is a schematic diagram of a program theme list screen according to the invention.

Referring to FIGS. 22 and 23, a Showcase area 2201 contains program listings that certain television or cable networks are promoting 2202. These are programs that the networks are currently promoting from their lineups. The user can, for example, move the highlight bar to the right and look at the network listings. The user can choose NBC 2203 by highlighting that particular line and moving the highlight bar 2204 to the right. The list of program categories for NBC will appear on the next screen 2301. The user can then move the highlight bar 2303 to highlight a program category and then move the highlight bar 2303 to the right to see the program listings on the next screen.

Referring again to FIG. 19, a screen displaying the information for a program is shown. The user is given the thumbs rating if it exists 1901 along with a program description and channel information. The user is presented with a list of options such as: watch now 1902; record the episode 1903; get a season pass 1904; view upcoming showings 1905; cancel the particular recording 1906; and view theme 1907 (which displays other shows in the same theme area).

Figure 24:
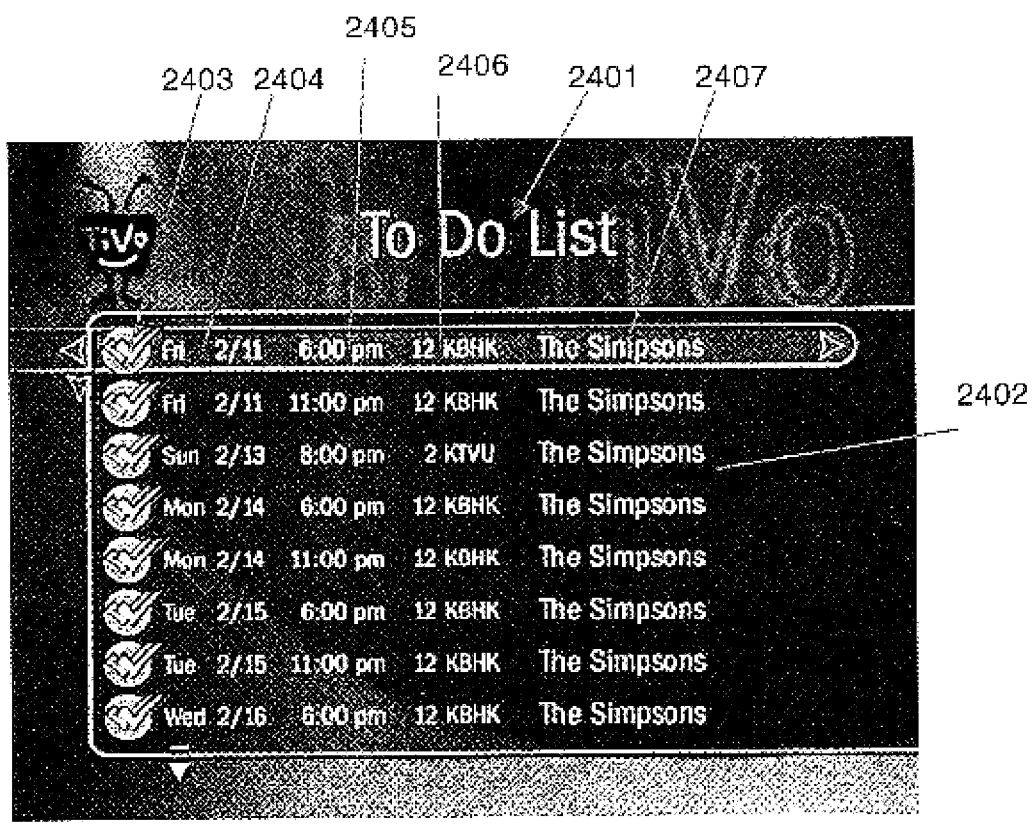
FIG. 24 is a schematic diagram of a todo list screen according to the invention.

With respect to FIG. 24, TiVo's To Do List 2401 contains a listing of the programs 2402 that the system is going to store on the system hard disk. A list of days beginning from the current day is displayed. Each day has a corresponding list of programs that the system will store on the system hard disk. The user can select the day that he wants to query by highlighting the particular day and moving the highlight bar to the right. A list of programs that the system will record on that particular day is displayed. Alternatively, the invention will display the entire list of programs 2402 with the day 2404 that the program will be recorded listed in line with the program name 2407.

A checkmark next to a program name indicates that the user has requested the system to record the program. Two checkmarks 2403 mean that the program 2407 is part of a season pass. The user can check or uncheck any program on the list. The programs that are checkmarked have a higher priority to be stored on the system hard disk than the unchecked programs.

If the user attempts to checkmark too many programs, the invention will notify the user that there will be insufficient room on the system hard disk. The user is told what programs should be freed up from the programs that are currently or planned to be saved on the system hard disk in order to save the desired program. The user can accept the system's recommendations or he can obtain a listing of what programs are currently stored and scheduled to be stored on the storage device and can choose to remove the unwanted programs from the storage device. The user selects the unwanted programs by placing an "X" next to the program's name or he can let the system select the programs that will be removed.

Figure 25:
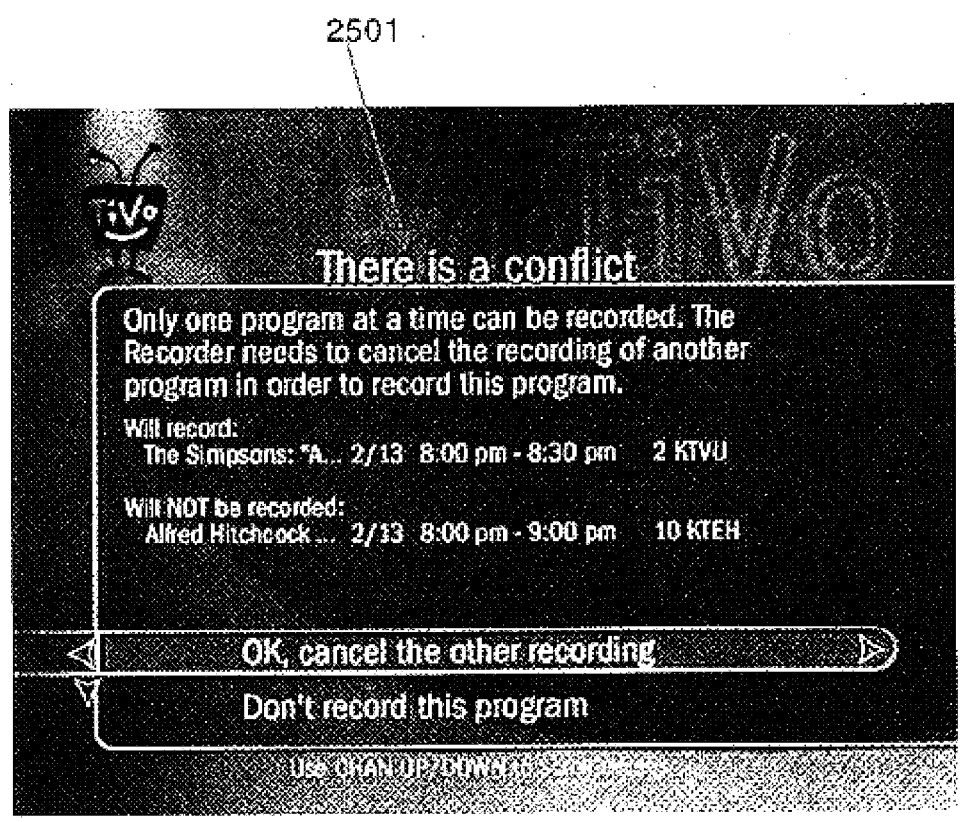
FIG. 25 is a schematic diagram of a conflict warning screen according to the invention.

Referring to FIG. 25, any program schedule conflicts are displayed 2501 to the viewer immediately whenever a conflict arises. Such conflicts can be caused, for example, by the viewer selecting two programs to be saved that are shown at the same time or have overlapping times when only one tuner is available.

Referring again to FIG. 14, the viewer can also use the thumbs up 1405 and thumbs down 1404 buttons on the remote control 1401 to tell the system what actors or types of shows he does or does not prefer. For example, the viewer can select actors from a list and place one, two, or three thumbs up or down next to a particular actor's name. The viewer can access his favorite actor list and add or delete actors from the list. Favorite directors are designated in the same way as favorite actors. The system adjusts to the viewer's preferences and suggests programs with the actors, directors, and types of shows that the user prefers.

Figure 26:
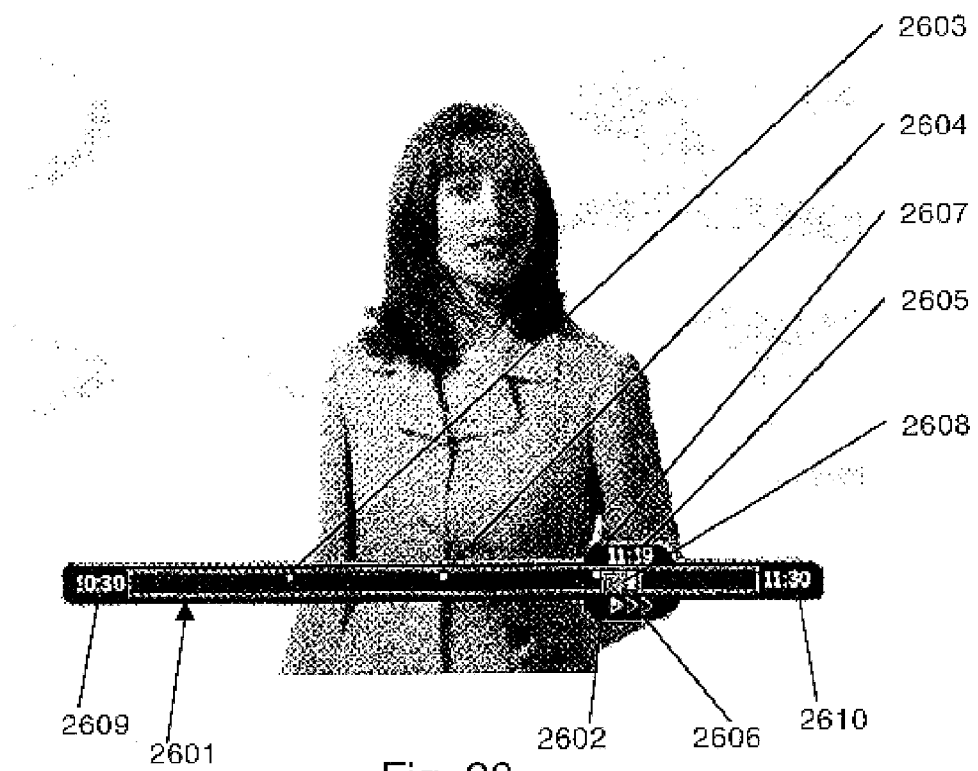
FIG. 26 is a schematic diagram of a tick play bar overlaid on program material according to the invention.

With respect to FIGS. 7 and 26, as the user watches a program, a trick play bar 2601 is overlaid onto the live video. The CPU 713 uses the OSD generator to display the trick play bar 2601 and its associated components through the digital mixer 718 to the TV or monitor. The trick play bar 2601 visually informs the user of the size of the circular program cache is and, if the cache is not at capacity, how much of the cache is filled. The CPU 713 is informed by the Media Switch 701 of the frame that is being displayed and the cache status.

The current program is stored in a circular cache as described above. The green cache bar 2602 inside of the trick play bar 2601 indicates how much of the circular cache is filled. Time marks 2603, 2604 are displayed inside the trick play bar 2601 giving the user a visual reference point from which to judge the current time and how far back in time the cache has recorded. The time marks 2603, 2604 can be any increment of time needed, but usually are in half hour or 15 minute increments. Every half hour (or selected increment), the cache bar 2602 slides to the left. The current time is always between the time indicated at right hand side 2610 of the trick play bar 2601 minus the time increment of the middle time mark 2604 when watching live television. The entire length of the trick play bar 2601 is calculated by subtracting the time indicated on the left hand side 2609 of the trick play bar 2601 from the time indicated on the right hand side 2610 of the trick play bar 2601.

A slider 2605 moves along the trick play bar 2601 and on top of the cache bar 2602. The slider 2605 along with the position indicator 2608 are linked together and tell the user visually where his current position is within the program material. The slider displays the time mark 2605 of the position. A mode indicator 2606 is positioned below the slider 2605 and follows the slider's 2605 movement. The mode indicator 2606 displays whether the user is in play, record, pause, slow play, fast play, fast forward (1×, 2×, and 3×), slow reverse play, slow reverse, and fast reverse (1×, 2×, and 3×) modes. The 1×, 2×, and 3× speeds are adjustable by the system to be any variable desired (e.g., 2×, 16×, and 32×).

The cache bar 2602 expands, when the cache has not been filled, to the right as more of the program is stored in the circular cache. If the cache is filled, the cache bar 2602 simply shifts to the right. When the cache bar 2602 reaches the end of the right side of the trick play bar 2601, it will shift to the left side of the trick play bar 2601 so the right hand end of the cache bar 2602 is positioned in the trick play bar 2601 at the time mark 2604. The slider 2605 and position indicator 2608 within the trick play bar 2601 will also shift in unison with the cache bar 2602, reflecting the current position in the cache. The time display at the right hand side 2607 of the trick play bar 2601 will be one half hour from the time mark 2604 at the middle of the trick play bar 2601 (when half hour increments are used).

The left half of the trick play bar 2601 can also display a compressed time scale. The compressed time scale is used when a large circular cache is used. Sometimes it is not desirable to have the right half of the trick play bar 2601 indicating a time span larger than a half an hour because the cache bar 2602 shifts to the left when it reaches the end of the right side and can be confusing to the user.

The slider 2605 can be moved anywhere within the cache bar 2602 by the user. The user uses the play 1411, rewind 1407, fast forward 1408, pause 1412, slow motion 1413, jump 1414, and instant replay 1415 buttons to position the slider 2605. The jump button 1414 positions the slider 2605 at the end of the cache bar 2602. While the instant replay button 1415 causes the slider 2605 to reposition ten seconds (the time span is system adjustable) backwards into the cache bar 2602, thereby allowing the user to view a portion of the program in the same manner as an instant replay operates in football broadcasts.

When the user watches a program that has been recorded, the trick play bar time indicator on the right hand side 2610 represents the total time of the program recording. The cache bar 2602 fills the entire trick play bar 2601 indicating that the program is stored entirely on the system. If a partial program is stored, then the cache bar 2602 displays the length of the program saved by the system. For example, if the user records a program after it has already started and the system does not have the beginning of the program stored in the cache, then the cache bar 2602 will show that the program starts a certain amount of time after the beginning of the program. The same type of behavior occurs when a program being recorded has prematurely ended. The cache bar 2602 will end at the point where the recording stopped. The slider 2605 displays the amount of time (e.g., one hour) in the program that the user is at. The mode indicator 2606 operates as described above and below.

Figure 27:
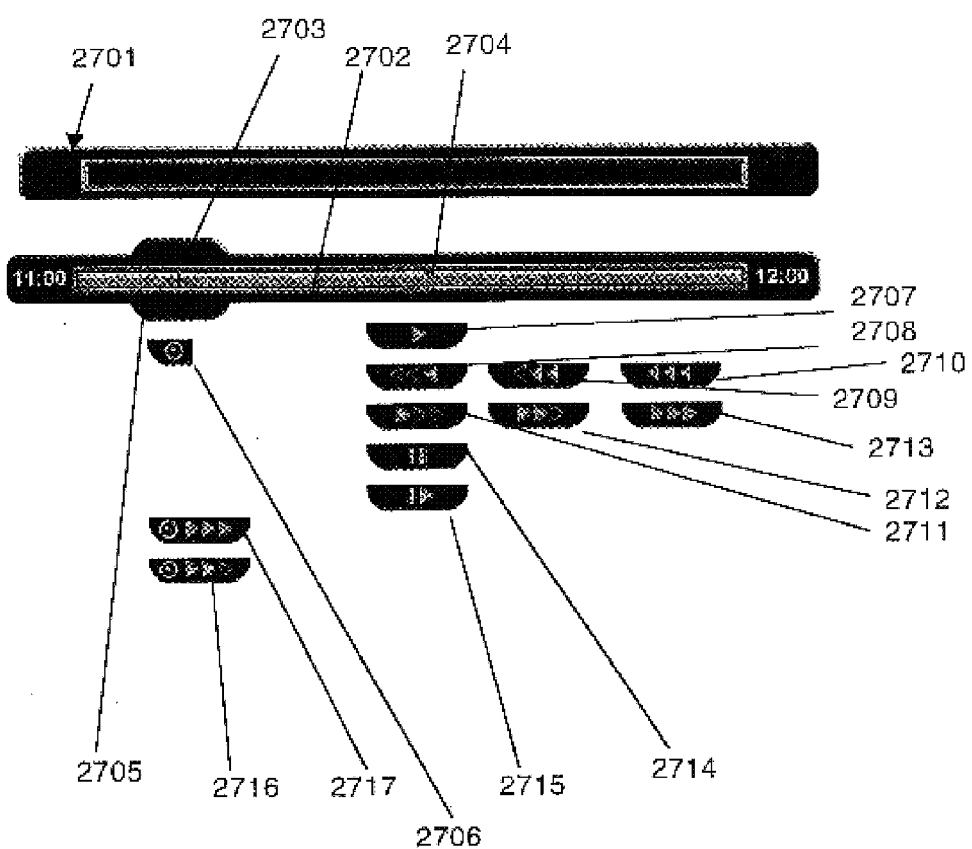
FIG. 27 is a schematic diagram of a the trick bar and its associated components according to the invention.
Figure 28:
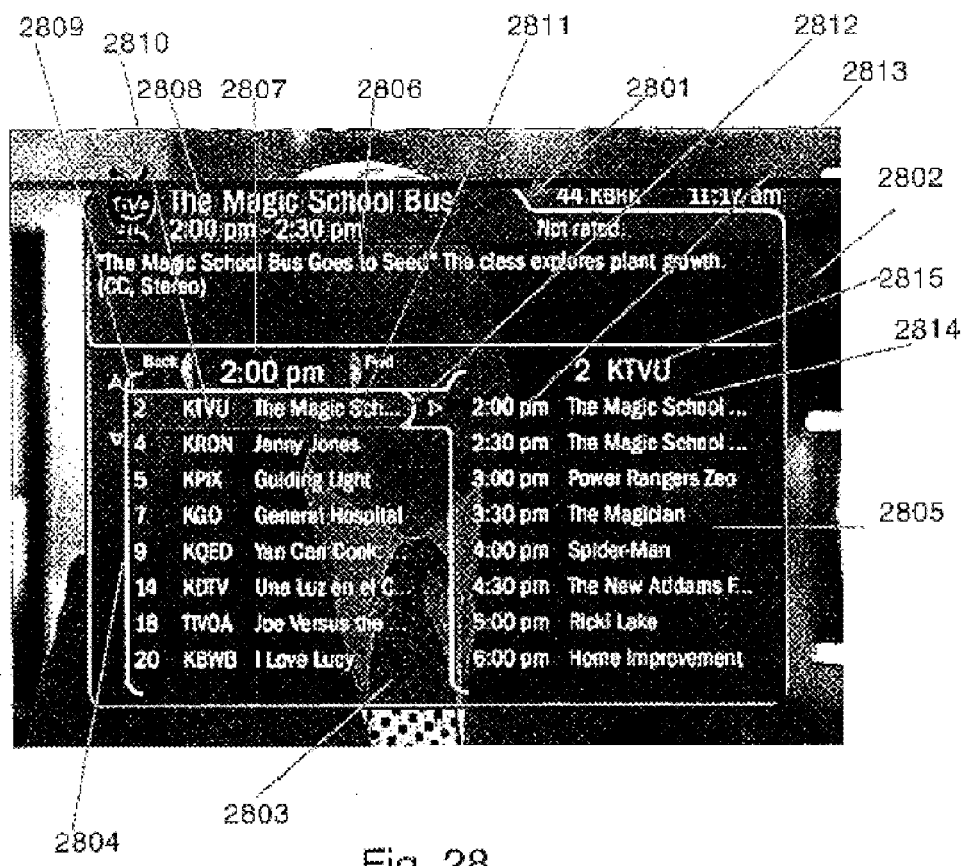
FIG. 28 is a schematic diagram of a two column multimedia schedule screen according to the invention.
Figure 29:
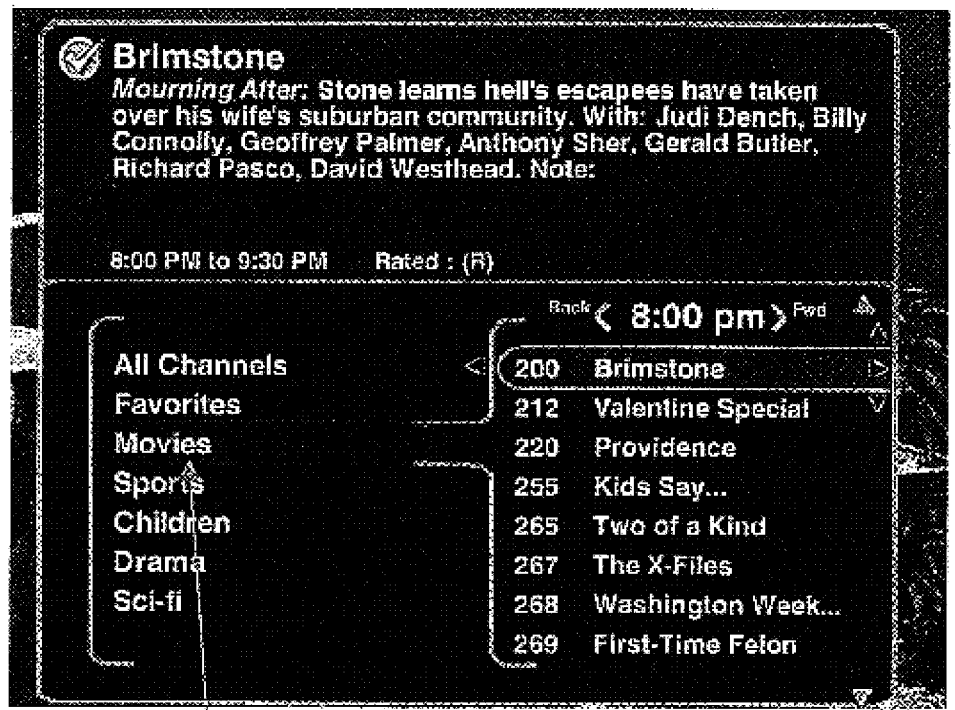
FIG. 29 is a schematic diagram of a two column theme-based schedule screen according to the invention.
Figure 30:
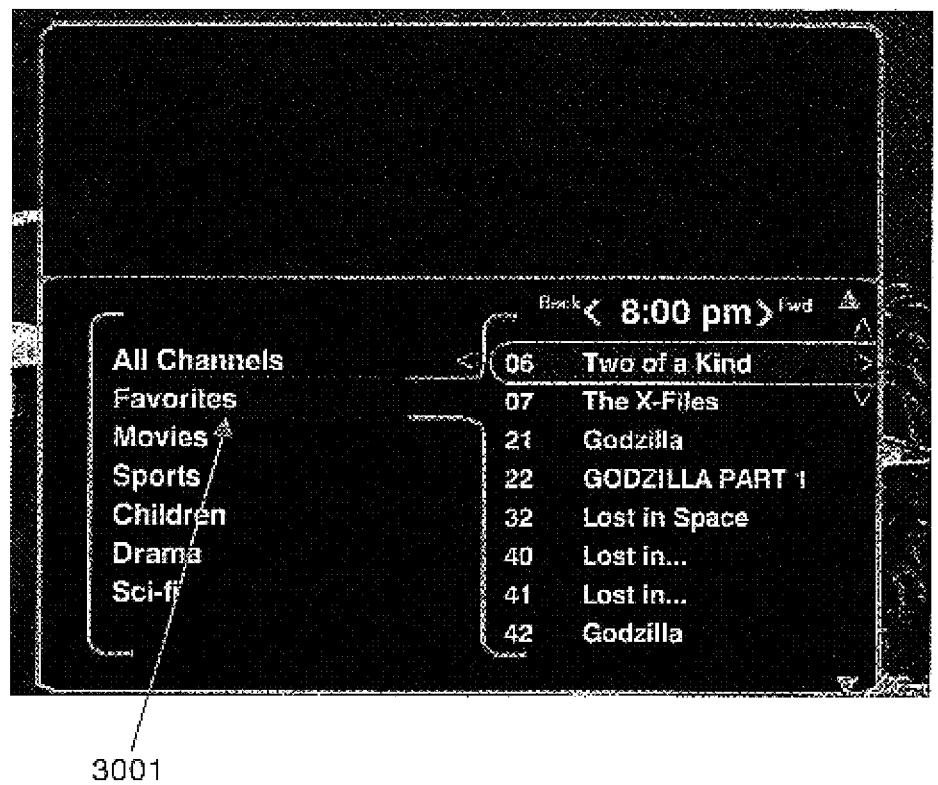
FIG. 30 is a schematic diagram of a two column theme-based schedule screen according to the invention.
Figure 31:
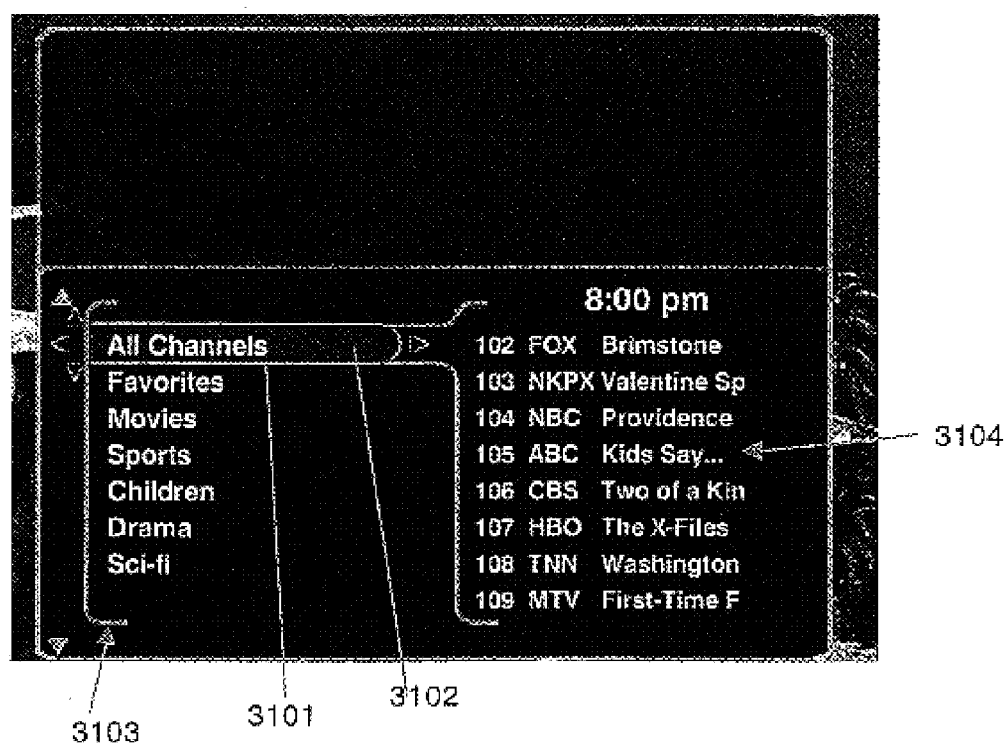
FIG. 31 is a schematic diagram of a two column theme-based schedule screen according to the invention.
Figure 32:
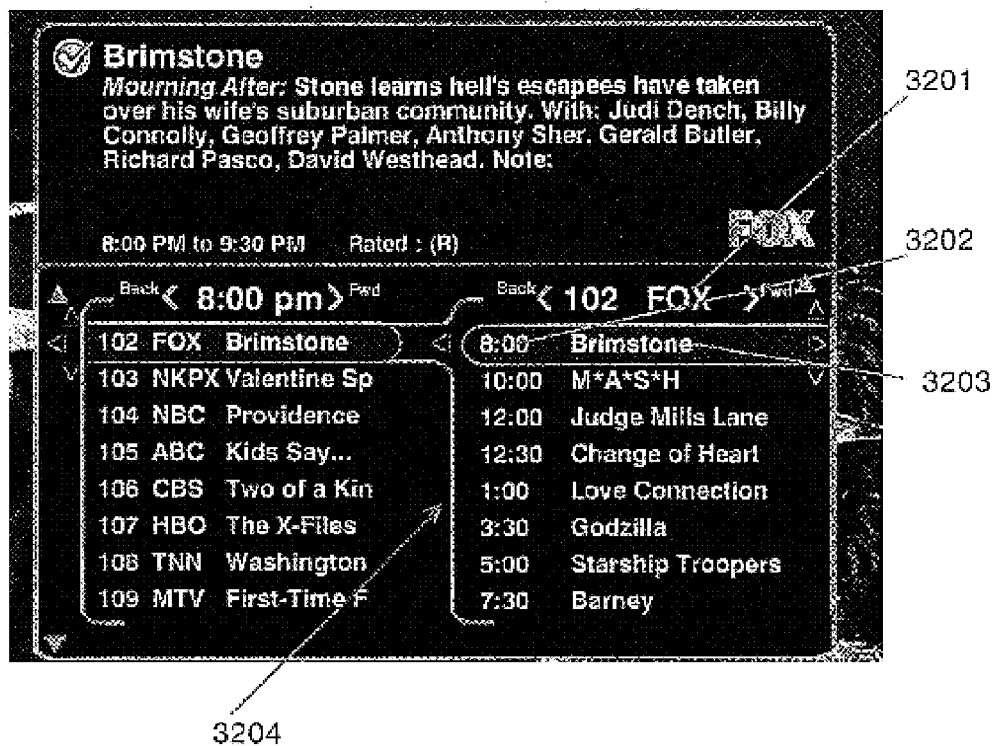
FIG. 32 is a schematic diagram of a two column program schedule screen according to the invention.
Figure 33:
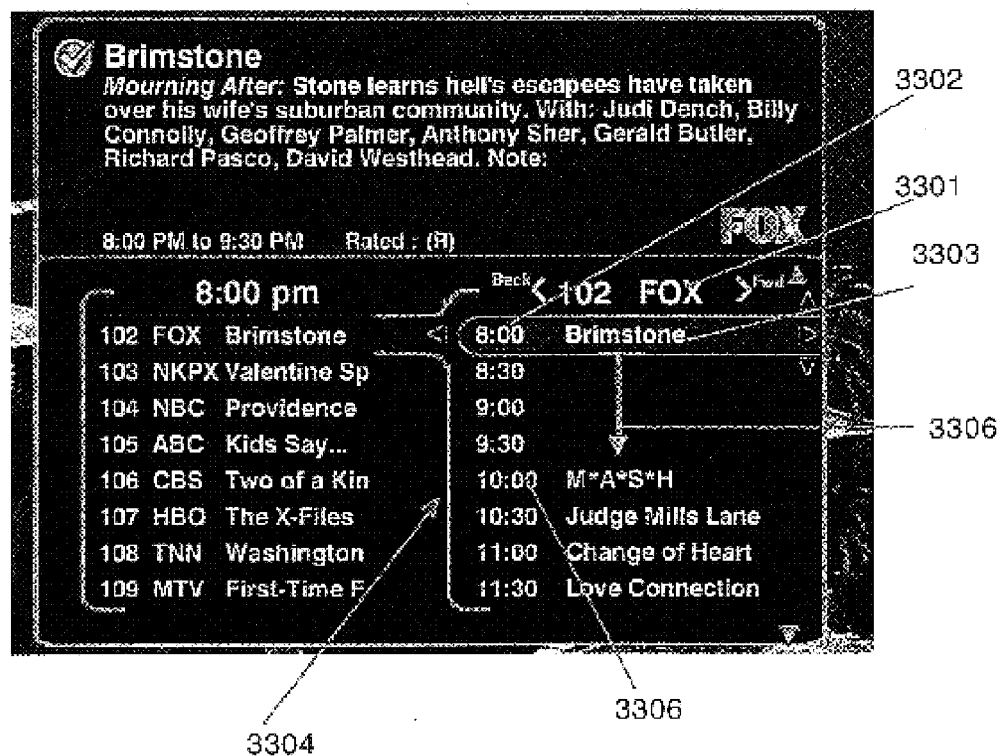
FIG. 33 is a schematic diagram of a two column program schedule screen showing a program duration indicator according to the invention.

Referring to FIG. 27, the components around the trick play bar are shown. The trick play bar is shown by itself 2701 and with the cache bar 2702, slider 2703, and a half-hour timing mark 2704. The mode indicator can indicate that a recording is in progress 2704. A unique aspect of the invention is that the user can move around the program material that has been recorded while the actual recording is taking place. The slider 2703 can be moved to any point in the cache bar 2702. The cache bar 2702 indicates the progress of the recording. The mode indicator 2705 will display any combination of record 2706 and play 2707, rewind (three speeds) 2708, 2709, 2710, fast forward (three speeds) 2711, 2712, 2713, pause 2714, and slow motion 2715. Examples of record combined with 2× fast forward 2716 and 3× fast forward 2717 are shown.

The trick play bar and its associated components are drawn over the program content for a short duration. The trick play bar appears whenever the user activates any of the trick play features i.e., record, play, rewind, fast forward, pause, and slow motion. If the mode is either play or record, then the trick play bar and its associated components will remain on the screen for a short time period. This removes any obstructions from the program material displayed on the screen and is for the convenience of the viewer. This time period is adjustable by the system. The trick play bar and its associated components may be displayed indefinitely if in an editing mode or a dedicated trick play display is used.

Additionally, index or bookmark indicators are displayed over the trick play bar. These marks appear as, for example, a vertical bar that is colored, flagged, or labeled uniquely giving the user visual cues that an index or bookmark exists in that position. The user can sequentially jump to each index or bookmark indicator by pressing the jump button 1414 on the remote control 1401. Indexes and bookmarks are easily placed or removed by the user as noted above.

One skilled in the art will readily appreciate that the invention's trick play bar can be applied to any video or audio application where the physical position in the material is readily ascertainable e.g., DVDs, VCRs, MP3s, etc.

Another unique aspect of the invention is that the user can watch a pre-recorded program stored on the storage device while the system is recording another program and storing it on the storage device. This simultaneous operation is a natural feature of the architecture of the invention. The number of programs being recorded and stored on the storage device is extended to the number of tuners or sources available in the system.

Referring again to FIGS. 14 and 15, the invention predicts the position (overshoot correction) in the program material where the user expects to be when the user stops the fast forward or reverse modes. The user commands from the remote control 1401 are received by the Control Input Module 1504. The user initially places the operational mode into fast forward or reverse by pressing the fast forward button 1408 or the reverse button 1407. The viewer interface 1503 tells the Media Control 1501 to fast forward or reverse the program material. Each successive press of the fast forward 1408 or reverse 1407 buttons places the system into the 1×, 2×, or 3× fast forward or reverse modes, respectively. When the user wants to stop the fast forward or reverse progression, he simply presses any other media control button, however the play button 1411 is most commonly used.

The viewer interface 1503 receives the command from the Control Input Module 1504 and tells the Media Control 1501 to stop. The Media Control 1501 sends the viewer interface 1503 the frame position where the program material was stopped.

The viewer interface then tells the Media Control 1501 to transition to the mode the user selected and passes the Media Control 1501 the frame to start the mode from. This frame start position is the present frame with an overshoot correction factor added or subtracted from it.

The invention adapts to the user by remembering how much the user corrects (i.e., reverses or fast forwards) after he stops the fast forward or reverse mode (in each speed). Correction factors are calculated by taking the user's corrections and setting the factors to the average, median, or any other method desired, for each speed. The system will adjust the correction factors if it observes that the user continues to make corrections.

The invention also uses a prediction method to correctly place the user within the program upon transition out of either mode. The prediction method determines if the user is in 1×, 2×, or 3× fast forward or reverse modes and then automatically subtracts or adds, respectively, a time multiple (depending upon the actual speed used for 1×, 2×, or 3×) to the frame where the transition was detected and positions the user at the correct frame. The system fine tunes the time multiple if it sees that the user is consistently correcting after the fast forward or rewind mode stops.

Another method initially tests the user's reaction time using a test video. It asks the user to press the fast forward 1408 or reverse 1407 button during the test video and then asks the user to position the video to the place that he expected the system to have been. This time span is then used whenever the user uses the fast forward or reverse modes and is adjusted with a multiple for each speed.

A final method allows the user to simply set a sensitivity setting that the system will use as a correction factor. The invention will subtract or add a multiple of the factor to the release frame whenever the user uses the fast forward or reverse modes, respectively.

One skilled in the art will readily appreciate that the invention's overshoot correction can be applied to any video or audio application where the physical position in the material is readily ascertainable e.g., DVDs, VCRs, MP3s, etc.

With respect to FIGS. 7, 14, 28, 29, 30, and 31 the invention displays a program guide area 2801 to the user which is a list of the programs that are currently airing, was aired, or is scheduled on live TV. Program guide information is stored on the storage device 710. The CPU 713 parses the program guide information and creates program schedule information.

The program guide area 2801 is semi-transparent and overlays on the actual broadcast program 2802 that the user is currently watching. The user can see how the program 2802 is progressing while he is browsing the program guide schedules 2803, thereby allowing the user to immediately switch back to the program 2802. For example, the user switches to browsing the program guide 2803 while a commercial break has occurred during the current program. The user sees when the commercial break ends and immediately switches back to the program 2802.

A simple touch of the Live TV Guide button 1409 on the remote control 1401 brings up a central program guide area 2801 where the user navigates through the program schedule information. The program guide area 2803 presents what is on live TV now, what is on all channels, and what is on a particular channel that is coming up. The invention displays the program guide information in two different modes: two column or three column. Generally, only two columns are shown on the screen at a time to declutter the display and present the information to the user in a friendlier format. The information is not presented in the traditional channel/time grid format.

The two column mode 2803 displays the available channels in a rotating endless list fashion in the left hand column 2804 and the programs for the highlighted channel in the right hand column 2805. The user scrolls or pages up or down through the channel list by pressing the button 1403 up or down, or the channel button 1410 up or down, respectively. The interface is consistent throughout all columns with respect to scrolling and paging. Whispering arrows are also consistent in this interface, showing that more information exists in the indicated direction. Information is also more detailed as the highlight bar is moved to the right (successive disclosure) as described above.

The current time period 2807 is shown above the left column 2804 on the screen. The time period 2807 is easily changed by the user. The user changes the time period 2807 through a single press of the back 1407 or forward 1408 button on the remote control 1401, moving the time period 2807 backward or forward, respectively. Below the time display is the listing of the channels 2804 available to the user. Next to each channel number 2809 is the station ID 2810 and the title 2811 of the current program that is being aired. The user moves the highlight bar 2812 over the channel that he is interested in and a description 2806, 2808 of the current program that is showing on the channel 2809 is displayed. A preferred embodiment of the invention places the description area 2806 above the two columns. As the user changes the time period 2807, the program titles 2811 change to the names of the program that were, are, or will be shown at that time period 2807. The programs in the right hand column 2805 will also change to correspond to the time period 2807.

Program information for the program currently showing on the highlighted channel is displayed in the upper area 2806, 2808 of the program guide area 2810. All of the data that the user needs to know about the program that is currently selected is displayed in the upper area 2806, 2808. This information includes: the program title; episode title; program description; the actors or actresses appearing in the program; any advisories; audio parameters; the genre that the program is in; start and stop times; the program's MPAA or TV rating; the logo of the network that the program is being broadcast on; the current time; if the program is selected to be recorded; if it has been selected as a season pass; if the user has expressed a thumbs up or down rating.

The user moves the highlight bar to the right hand column 2805 by pressing the right side of the button 1403 on the remote control 1401 allowing him to scroll through the programs 2805 for that particular channel. As each program is highlighted, the program's information (as described above) is displayed in the upper area 2806, 2808 of the program guide area 2801.

The right hand column 2805 displays a schedule of the programs for the particular channel. The schedule begins at the time 2807 indicated above the left column 2804. The program name 2814 and start time 2813 are displayed. For example, channel 2 is highlighted and the right hand column shows all of the programs showing from the current or selected time. The user can move the highlight bar up and down the list of programs 2805, scrolling through the time slots for each day in the program guide information. As described above, a page up or page down function is also easily accessed by the user. This saves the user the effort of having to scroll through the program list in either column.

The channel number and ID 2815 are displayed above the right hand column 2805. The user changes the channel number 2815 through a single press of the back 1407 or forward 1408 button on the remote control 1401, moving the channel number 2815 backward or forward, respectively, through the channel list. The channel list in the left hand column 2804 follows the user's channel selections, scrolling backward or forward in the channel list. The program list in the right hand column 2805 changes to the programs associated with the channel number 2815 selected by the user, starting at the time indicated 2807 above the left hand column 2804.

The program list in the right hand column 2805 can be shown in two intuitive forms. The first form 3201 lists the start time 3202 of each program next to the program name 3203. The list 3204 is in descending order from the most recent time to the latest time.

The second form 3301 also lists the start time 3302 next to each of the program names 3303. The list 3304 continues the time intervals 3302 by listing each half, quarter hour, or selectable intervals. The duration of the program is indicated by an arrow 3305 extending from the program start time 3302 down to the program end time 3306. This gives the user a visual cue as to the duration of the program time slot.

The user can highlight a program and again move the highlight bar to the right to obtain a screen such as the one shown in FIG. 18. The user is given choices to watch the program now (if the program is currently airing) 1802, record the episode 1803, get a season pass 1804, view a list of the upcoming showings of the program 1805, cancel the recording (if the program is being recorded or is scheduled to be recorded) 1806, or view programs in that theme area 1807.

The three column mode adds a higher level column to the two-column mode. This means that, conceptually, an additional column is added to the left of the channel column, although visually, only two columns are displayed at a time. Larger screens and higher resolutions will allow all three columns to be displayed at once. The program guide information is sorted in different ways, e.g., all movies 2901, favorite channels 3001, all channels 3101, all sports, etc. The first column 3103 contains the sorting methods available to the user. The second column 3104 presents the available channels that correspond to the sorting method with the description of the channel column consistent with that of the two-column method. The user simply highlights the preferred sorting method with the highlight bar 3102. The sorted channels then appear in the right hand column 3104.

The user can then move the highlight bar to the right hand column 3104 by pressing the right side of the button 1403 on the remote control 1401 allowing him to scroll through the channels 3104. The program information for the highlighted channel is displayed in the upper screen area of the program guide area as described above. The user can once again move the highlight bar to the right to obtain the two column channel/program format described above. This two column format may differ (when a sort method other than all channels is selected) in that the channels displayed in the left hand column are those that correspond to the sorting method.

The user presses the Live TV Guide button 1409 again to remove the program guide area 2801 from the screen and to return to the program viewing mode.

The invention generates transitional sounds through the digital mixer 718, as described above, whenever the user moves the highlight bar to another area. Warning sounds occur when the user attempts an action that is not allowed, e.g., when the user tries to move the highlight bar to an area that does not exist, i.e., where a whispering arrow is not displayed. These sounds can be turned on or off by the user.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A process for automatically correcting the playback position within an audio or video program's material after a user terminates a fast forward or reverse progression through the program material, comprising the steps of:

providing a media controller;

receiving user command input;

terminating the fast forward or reverse progression through the program material based on the user's command;

wherein said media controller detects the current position in said program material where said termination occurred;

calculating a new position by adding a positional offset to said current position when reverse mode has been terminated or subtracting a positional offset from said current position when fast forward mode has been terminated; and commanding said media controller to display said program material starting at said new position.

2. The process of claim 1, wherein said positional offset is determined by observing the amount that the user corrects by reversing or fast forwarding again after the user terminates the fast forward or reverse progression then setting said positional offset to a factor of the user's corrections.

3. The process of claim 1, wherein said positional offset is adjusted when the user continues to make corrections.

4. The process of claim 1, wherein said positional offset is a fixed value.

5. The process of claim 1, wherein said positional offset is calculated by testing the user's reaction time using a test video where the user initiates and then terminates the fast forward or reverse mode while the test video is playing, the user then positions the video to the position that he expected the termination to occur, the difference between the termination point and the expected point is the value of the positional offset.

6. The process of claim 1, wherein said positional offset is calculated using a sensitivity setting that is selected by the user.

7. An apparatus for automatically correcting the playback position within an audio or video program's material after a user terminates a fast forward or reverse progression through the program material, comprising:

a media controller;

a module for receiving user command input;

a module for terminating the fast forward or reverse progression through the program material based on the user's command;

wherein said media controller detects the current position in said program material where said termination occurred;

a module for calculating a new position by adding a positional offset to said current position when reverse mode has been terminated or subtracting a positional offset from said current position when fast forward mode has been terminated; and a module for commanding said media controller to display said program material starting at said new position.

8. The apparatus of claim 7, wherein said positional offset is determined by observing the amount that the user corrects by reversing or fast forwarding again after the user terminates the fast forward or reverse progression then setting said positional offset to a factor of the user's corrections.

9. The apparatus of claim 7, wherein said positional offset is adjusted when the user continues to make corrections.

10. The apparatus of claim 7, wherein said positional offset is a fixed value.

11. The apparatus of claim 7, wherein said positional offset is calculated by testing the user's reaction time using a test video where the user initiates and then terminates the fast forward or reverse mode while the test video is playing, the user then positions the video to the position that he expected the termination to occur, the difference between the termination point and the expected point is the value of the positional offset.

12. The apparatus of claim 7, wherein said positional offset is calculated using a sensitivity setting that is selected by the user.

13. A program storage medium readable by a computer, tangibly embodying a program of instructions executable by the computer to perform method steps for automatically correcting the playback position within an audio or video program's material after a user terminates a fast forward or reverse progression through the program material, comprising the steps of:

providing a media controller;

receiving user command input;

terminating the fast forward or reverse progression through the program material based on the user's command;

wherein said media controller detects the current position in said program material where said termination occurred;

calculating a new position by adding a positional offset to said current position when reverse mode has been terminated or subtracting a positional offset from said current position when fast forward mode has been terminated; and commanding said media controller to display said program material starting at said new position.

14. The method of claim 13, wherein said positional offset is determined by observing the amount that the user corrects by reversing or fast forwarding again after the user terminates the fast forward or reverse progression then setting said positional offset to a factor of the user's corrections.

15. The method of claim 13, wherein said positional offset is adjusted when the user continues to make corrections.

16. The method of claim 13, wherein said positional offset is a fixed value.

17. The method of claim 13, wherein said positional offset is calculated by testing the user's reaction time using a test video where the user initiates and then terminates the fast forward or reverse mode while the test video is playing, the user then positions the video to the position that he expected the termination to occur, the difference between the termination point and the expected point is the value of the positional offset.

18. The method of claim 13, wherein said positional offset is calculated using a sensitivity setting that is selected by the user.

* * * * *

UNITED STATES PATENT AND TRADEMARK OFFICE
CERTIFICATE OF CORRECTION

PATENT NO. : 6,850,691 B1
DATED : February 1, 2005
INVENTOR(S) : Wijnand Van Stam et al.

It is certified that error appears in the above-identified patent and that said Letters Patent is hereby corrected as shown below:

Title page,
Item [73], Assignee, "Assignee: Tivo, Inc., Alviso, CA (US)" should be -- Assignee: TiVo Inc., Alviso, CA (US) --.

Column 24,
Line 38, "or" should read -- and --;
Lines 41-42, "commanding said media controller to display said program material starting at said new position." should read -- commanding said media controller to display said program material starting at said new position; wherein said positional offset is adjusted to different speeds of fast forward and reverse. --;

Column 25,
Line 11, "or" should be -- and --;

Column 26,
Line 14, "or" should be -- and --.

Signed and Sealed this

Twenty-eighth Day of June, 2005

JON W. DUDAS
*Director of the United States Patent and Trademark Office*